United States Patent
Iwamoto et al.

(10) Patent No.: US 6,924,316 B2
(45) Date of Patent: Aug. 2, 2005

(54) METHOD FOR PRODUCING HYDROCARBONS BY FISCHER-TROPSCH PROCESS

(75) Inventors: Osamu Iwamoto, Satte (JP); Shigenori Nakashizu, Satte (JP); Kinjiro Saito, Satte (JP); Takashi Suzuki, Satte (JP)

(73) Assignees: Japan National Oil Corporation, Tokyo (JP); Cosmo Oil Co., Ltd., Tokyo (JP)

( * ) Notice: Subject to any disclaimer, the term of this patent is extended or adjusted under 35 U.S.C. 154(b) by 0 days.

(21) Appl. No.: 10/476,131

(22) PCT Filed: Jun. 17, 2002

(86) PCT No.: PCT/JP02/06015

§ 371 (c)(1),
(2), (4) Date: Oct. 27, 2003

(87) PCT Pub. No.: WO02/102932

PCT Pub. Date: Dec. 27, 2002

(65) Prior Publication Data

US 2004/0157938 A1 Aug. 12, 2004

(30) Foreign Application Priority Data

Jun. 18, 2001 (JP) .................................... 2001-183341
Sep. 28, 2001 (JP) .................................... 2001-300819

(51) Int. Cl.⁷ .............................................. C07C 27/00
(52) U.S. Cl. ........................................ 518/717; 518/715
(58) Field of Search ............................... 518/715, 717

(56) References Cited

U.S. PATENT DOCUMENTS

| 4,585,799 A | 4/1986 | Morris et al. |
| 4,728,672 A | 3/1988 | Yoshinari et al. |
| 5,348,982 A | 9/1994 | Herbolzheimer et al. |
| 6,121,333 A | 9/2000 | Clerici et al. |

FOREIGN PATENT DOCUMENTS

| EP | 0 253 924 A1 | 1/1988 |
| EP | 0 533 227 A1 | 3/1993 |
| JP | 59-48424 A | 3/1984 |
| JP | 11-179204 A | 7/1999 |

OTHER PUBLICATIONS

Supplementary European Search Report dated Aug. 20, 2004.

*Primary Examiner*—J. Parsa
(74) *Attorney, Agent, or Firm*—Sughrue Mion, PLLC

(57) ABSTRACT

A method for producing hydrocarbons, comprising: (I) subjecting to a reduction treatment a catalyst comprising a carrier having provided thereon: 0.1 to 10% by mass of at least one metal selected from an alkali metal, an alkaline earth metal, a rare earth metal and the Group III in the periodic table and 1 to 30% by mass of ruthenium, each based on the catalyst weight, the carrier comprising an aluminum oxide and a manganese oxide having an average number of charges of manganese of exceeding $Mn^{2+}$, and the catalyst having a specific surface area of from 60 to 350 $m^2/g$ and a bulk density of from 0.8 to 1.8 g/ml; (II) dispersing the catalyst in liquid hydrocarbons in a concentration of from 1 to 50 w/v %; and (III) bringing the catalyst into contact with a gas mixture comprising hydrogen and carbon monoxide at a pressure of from 1 to 10 MPa, and (i) at a reaction temperature of from 170 to 300° C. under such conditions that carbon dioxide is substantially absent, or (ii) at a reaction temperature of from 200 to 350° C. under such conditions that carbon dioxide coexists in an amount of from 0.5 to 50% based on the total pressure of the hydrogen and the carbon monoxide.

10 Claims, No Drawings

METHOD FOR PRODUCING HYDROCARBONS BY FISCHER-TROPSCH PROCESS

TECHNICAL FIELD

The present invention relates to a method for producing hydrocarbons from a gas mixture comprising hydrogen and carbon monoxide as main components (hereinafter referred to as "synthesis gas"). More specifically, it relates to a method for producing hydrocarbons, particularly hydrocarbons rich in olefin components along with wax components which can be easily converted into kerosine and gas oil fractions, comprising bringing the synthesis gas into contact with a ruthenium catalyst using a carrier comprising an aluminum oxide and a manganese oxide which is dispersed in liquid hydrocarbons.

BACKGROUND ART

As methods for synthesizing hydrocarbons from the synthesis gas, a Fischer-Tropsch reaction (hereinafter referred to as the "FT reaction"), a methanol synthesis method, a $C_2$-containing oxygen (ethanol, acetaldehyde) synthesis reaction and the like are well known. It is known that the FT reaction proceeds by an iron system catalyst containing iron, cobalt, ruthenium or the like, and the methanol synthesis reaction proceeds by a copper system catalyst and the $C_2$-containing oxygen synthesis reaction proceeds by a rhodium system catalyst, and it is known that the catalytic ability of catalysts to be used in the synthesis of the hydrocarbons is strongly related to the dissociative adsorption ability of carbon monoxide (e.g., *Homogeneous Catalysts and Heterogeneous Catalysts*, edited by Hidai and Ichikawa, published by Maruzen, 1983).

On the other hand, low sulfur content gas oil is in demand in recent years from the viewpoint of atmospheric environmental protection, and it is considered that this tendency will become stronger in the future. Also, since crude oil is limited, development of an energy source that replaces the oil is in demand, and it is considered that this demand will become stronger in the future. As a technique that meets these demands, so-called GTL (gas to liquid) is known as a technique for synthesizing liquid fuels such as kerosine and gas oils from natural gas (main component: methane) which is considered to have recoverable reserves equivalent to crude oil on energy conversion basis. Since natural gas contains no sulfur components, or if contained, they are hydrogen sulfide ($H_2S$), mercaptan ($CH_3SH$) and the like which can be easily desulfurized, the thus obtained liquid fuels kerosine and gas oils and the like hardly contain sulfur components therein and they have advantages in that, e.g., they can be applied to high performance diesel fuel having a high cetane number, so that the GTL has been drawing attention more and more in recent years.

As a part of the GTL, a method for producing hydrocarbons from a synthesis gas by the FT reaction is being studied actively. In order to increase the yield of kerosine and gas oil fractions in producing hydrocarbons by the FT method, it is important to synthesize hydrocarbons equivalent to $C_{10}$ to $C_{16}$ hydrocarbons efficiently. In general, it is said that the distribution of carbon numbers of hydrocarbon products by the FT reaction follows the Shultz-Flory rule, and it is considered that, according to the Shultz-Flory rule, the chain propagation probability ($\alpha$) value has a tendency to greatly decrease with increase in the reaction temperature, namely a tendency that the number of carbons of formed hydrocarbons is greatly reduced when the reaction temperature is increased. It seems that technical developments such as catalyst development and the like had been positively carried out formerly with the aim of selectively synthesizing hydrocarbons having a specified number of carbons by excluding the Shultz-Flory rule, but a technique which sufficiently resolved this problem has not been proposed yet. Rather, it is a recent idea that the yield of fractions which can be easily made into kerosine and gas oil fractions by hydro-cracking of wax components and the like is increased, not sticking to the exclusion of Shultz-Flory rule, and the wax components and the like are subjected to hydro-cracking to increase the yield of kerosine and gas oil fractions as the result. However, since the chain propagation probability ($\alpha$) at the present time is around 0.85, it is one of the recent technical problems how to increase the value. Nevertheless, since the wax components become the majority of the formed hydrocarbons when the chain propagation probability ($\alpha$) is increased too high, a problem on the process operation is generated instead so that, also from the viewpoint of general properties of the catalyst, it is considered that around 0.95 is the actual upper limit of the chain propagation probability ($\alpha$).

Accordingly, in order to increase the yield of the kerosine and gas oil fractions further, it is necessary to consider formation of kerosine and gas oil fractions by forming lower olefin and carrying out its dimerization, trimerization and the like, in addition to the improvement of kerosine and gas oil fractions by forming wax components and carrying out the hydro-cracking. It is considered that such a still more improvement of the yield of kerosine and gas oil fractions can be achieved by carrying out the FT reaction which has high chain propagation probability ($\alpha$), is excellent in the olefin selectivity in the formed lower hydrocarbon and is also excellent in the productivity of a liquid hydrocarbon fraction having a carbon number of 5 or more (hereinafter referred to as "$C_5+$").

Also, regarding the synthesis gas which is the material of the production of hydrocarbons by the FT method in the GTL process, the synthesis gas is mainly obtained by reforming a natural gas into a gas mixture comprising hydrogen and carbon monoxide as main components, by a reforming method such as autothermal reforming or steam reforming. However, since a water gas shift reaction of the following equation (II) occurs by this reforming in parallel with a reforming reaction of the following equation (I), carbon dioxide gas is inevitably contained in the thus obtained synthesis gas. In addition, since unused natural gas fields contain carbon dioxide gas in many cases, the use of such a carbon dioxide gas-containing natural gas as the material results in larger carbon dioxide gas content in the thus obtained synthesis gas.

$$CH_4+H_2O=3H_2+CO \tag{I}$$

$$CO+H_2O=H_2+CO_2 \tag{II}$$

Also, as shown by the following equation (III), a liquid hydrocarbon is synthesized from the synthesis gas by the FT reaction, a tendency of obstructing synthesis of the hydrocarbon becomes strong when carbon dioxide gas is contained in the reaction system (Suzuki et al., *Abstract of Papers, the 63rd Spring Annual Meeting of The Chemical Society of Japan*, 3C432, 1992). Also, when the carbon dioxide gas content is increased, a hydrogen partial pressure in the reaction system is decreased in addition to the reaction inhibition of carbon dioxide gas, so that it becomes an undesirable situation for the FT reaction from this point, too.

$$nCO+2nH_2=(CH_2)_n+nH_2O \tag{III}$$

Accordingly, it becomes essential for the conventional GTL process to incorporate a decarbondioxide step for removing carbon dioxide gas in the synthesis gas, between a step for producing a synthesis gas from a natural gas and a step for synthesizing a liquid hydrocarbon from the synthesis gas. Generally, amine absorption or pressure swing adsorption (PSA) is used in the decarbondioxide step, but such a decarbondioxide step is not desirable in any case, because it causes rise in construction cost and operation cost. When the decarbondioxide step can be simplified or omitted by enabling the FT reaction suitably in the coexistence of carbon dioxide gas, it can be greatly contributed to the reduction of production cost of the liquid hydrocarbon in the GTL process.

However, neither catalyst nor process, by which the FT reaction having high chain propagation probability ($\alpha$) and excellent olefin selectivity and $C_5+$ productivity and capable of sufficiently achieving further more improvement of the yield of kerosine and gas oil fractions can be carried out, has been proposed yet. Various catalysts for the FT reaction have been proposed, and a ruthenium catalyst comprising a manganese oxide carrier having provided thereon ruthenium, a ruthenium series catalyst in which a third component was added to the ruthenium catalyst, and the like have been proposed as catalysts for high selectivity for olefins (JP-B-3-70691, JP-B-3-70692, and the like). However, further more improvement of the yield of kerosine and gas oil fractions cannot be achieved sufficiently by the FT method using the ruthenium series catalysts. That is, since the ruthenium series catalysts are developed with the aim of using them in a fixed-bed system, the fixed-bed FT method using the ruthenium series catalysts has a problem in that the reaction cannot be carried out stably and smoothly, because not only insufficient chain propagation probability ($\alpha$) and the like of the ruthenium series catalysts, but also the fixed-bed reaction system is apt to cause reduction of the catalytic activity when wax components are formed in a large amount, due to accumulation of the formed wax components to the active site of the catalyst and subsequent covering of the site, as well as its aptness to generate heat spots when the catalyst bed is topically overheated.

What is more, as described above, neither catalyst nor process, by which the FT reaction having high chain propagation probability ($\alpha$) and excellent olefin selectivity and $C_5+$ productivity and capable of sufficiently achieving further more improvement of the yield of kerosine and gas oil fractions can be carried out in the coexistence of carbon dioxide gas, has been proposed yet.

DISCLOSURE OF THE INVENTION

An object of the present invention is to provide the FT method which has high chain propagation probability ($\alpha$), is excellent in olefin selectivity and $C_5+$ productivity, has high catalytic activity, can perform the reaction stably and smoothly without generating heat spots and can carry out the desired reaction in the optional coexistence of carbon dioxide gas.

Another object is to provide the FT method which can contribute to the increased production of kerosine and gas oil fractions further more greatly than conventional methods, by hydro-cracking of the formed wax components and dimerization, trimerization and the like of the formed olefin, and also can contribute greatly to the reduction of production cost of kerosine and gas oil fractions by simplifying or omitting the decarbondioxide step for removing carbon dioxide gas in the synthesis gas.

The present invention relates to a method for producing hydrocarbons, comprising:
(I) subjecting to a reduction treatment a catalyst comprising a carrier having provided thereon:
  0.1 to 10% by mass of at least one metal selected from an alkali metal, an alkaline earth metal, a rare earth metal and the Group III in the periodic table based on the catalyst weight, and
  1 to 30% by mass of ruthenium based on the catalyst weight,
  said carrier comprising an aluminum oxide and a manganese oxide having an average number of charges of manganese of exceeding $Mn^{2+}$, and
  said catalyst having a specific surface area of from 60 to 350 $m^2/g$ and a bulk density of from 0.8 to 1.8 g/ml;
(II) dispersing the catalyst in liquid hydrocarbons in a concentration of from 1 to 50 w/v %; and
(III) bringing the catalyst into contact with a gas mixture comprising hydrogen and carbon monoxide at a pressure of from 1 to 10 MPa, and
  (i) at a reaction temperature of from 170 to 300° C. under such conditions that carbon dioxide is substantially absent, or
  (ii) at a reaction temperature of from 200 to 350° C. under such conditions that carbon dioxide coexists in an amount of from 0.5 to 50% based on the total pressure of the hydrogen and the carbon monoxide.

BEST MODE FOR CARRYING OUT THE INVENTION

In order to achieve the above objects, the present inventors have conducted intensive studies and found as a result that the FT method can be carried out stably and smoothly with high chain propagation probability ($\alpha$), excellent olefin selectivity and $C_5+$ productivity and high catalytic activity without generating heat spots and the like, under such conditions either that carbon dioxide gas (carbon dioxide) is substantially absent or that carbon dioxide coexists, by using, as a catalyst, one comprising a carrier having provided thereon predetermined amounts of a specific metal such as an alkali metal and ruthenium, wherein the carrier comprises an aluminum oxide and a certain manganese oxide and wherein the catalyst has a relatively large predetermined specific surface area and a relatively small predetermined bulk density, and by subjecting the catalyst to reduction treatment in advance, dispersing the catalyst in liquid hydrocarbons at a predetermined concentration, and then bringing the dispersed catalyst into contact with a material synthesis gas, so that the above objects can be achieved. Also, the present inventors had found that the FT reaction rate is further enhanced and the conversion ratio of carbon monoxide is further improved when the reaction is carried out in the coexistence of a predetermined amount of carbon dioxide, and the present invention has been accomplished based on these findings.

According to the present invention, reduction of the catalytic activity caused by the accumulation of wax components to the catalytic active site can be prevented even when the amount of the wax components in the reaction mixture becomes large, and the reaction can be carried out stably and smoothly by inhibiting generation of heat spots and the like, because of the specific reaction system described above in which the dispersed catalyst in liquid hydrocarbons at a predetermined concentration is brought into react with the material synthesis gas. Also, the catalyst having the specified composition and physical properties described above is most suitable for the specific reaction system described above, can realize the FT reaction having high chain propagation probability ($\alpha$) and excellent olefin selectivity and $C_5+$ productivity, and can realize the suitable FT reaction under such conditions either that carbon dioxide is substantially absent or that a predetermined amount of carbon dioxide coexists. Also, the reaction in the coexistence of a predetermined amount of carbon dioxide is preferable since the FT reaction rate is further enhanced and the conversion ratio of carbon monoxide is further improved.

In general, it is considered that reduction of the bulk density of catalyst is effective for improving productivity of the substance of interest per catalyst weight, but the objects of the present invention cannot be achieved by simply reducing the bulk density of the catalyst. That is, as will be described later in Comparative Example 6 for example, a conventionally known catalyst comprising an alumina carrier having a small bulk density and having provided thereon sodium and ruthenium shows low $C_5+$ productivity, and its chain propagation probability ($\alpha$) and olefin selectivity are also low, so that the objects of the present invention cannot be achieved. On the other hand, in the catalyst used in the present invention which comprises a carrier having provided thereon a metal such as an alkali metal and ruthenium, wherein the carrier comprises an aluminum oxide and a certain manganese oxide, the $C_5+$ productivity can be increased by limiting its bulk density within a relatively small range, and its high chain propagation probability ($\alpha$) and olefin selectivity can also be obtained, so that the above object can be achieved.

The present invention will be explained below in more detail.

According to the method of the present invention, as a catalyst, used is one comprising a carrier having provided thereon at least one metal selected from the group consisting of an alkali metal, an alkaline earth metal, a rare earth metal and the Group III in the periodic table and ruthenium, wherein the carrier comprises an aluminum oxide and a manganese oxide having an average number of charges of manganese of exceeding $Mn^{2+}$, and wherein amounts of the metal and ruthenium and its physical properties including a specific surface area and a bulk density are within the following predetermined ranges.

As the aluminum oxide which is one component of the carrier of the catalyst used in the present invention, neutral alumina or alumina showing base property is preferably used in order to obtain high chain propagation probability ($\alpha$) and stable reaction activity. When acidic alumina is used, it is necessary to take care because of a possibility of reducing the chain propagation probability ($\alpha$) and reducing the reaction activity. As the manganese oxide which is the other component of the carrier, a manganese oxide having an average number of charges of manganese of exceeding $Mn^{2+}$ is used. For example, as described in the U.S. Pat. No. 4,206,134, a manganese oxide having an average number of charges of manganese of $Mn^{2+}$ or less is suitable for the formation of olefin of gaseous hydrocarbon ($C_2$ to $C_4$), but is not suitable for the production of liquid hydrocarbons which are the objects of the present invention. Preferred examples of the manganese oxide having an average number of charges of manganese of exceeding $Mn^{2+}$ include $MnO_2$, $Mn_2O_3$, $Mn_3O_4$ and the like. In addition, a manganese oxide having an average number of charges of manganese of exceeding $Mn^{2+}$ obtained from salt other than oxide such as manganese nitrate or the like as the starting material can also be used. For example, $Mn_2O_3$ and the like obtained by burning manganese nitrate in the air can be preferably used. A ratio of the aluminum oxide and the manganese oxide on the carrier is generally from 5 to 160 mass parts, preferably from 10 to 110 mass parts, of the manganese oxide based on 100 mass parts of the aluminum oxide. When the ratio of the manganese oxide is less than 5 mass parts, interaction of the manganese oxide with the metal and ruthenium is reduced and each of the chain propagation probability ($\alpha$), $C_5+$ selectivity and olefin/paraffin ratio is reduced, thus having a possibility of being not suitable for the production of a liquid hydrocarbon. When it exceeds 160 mass parts, on the other hand, there is a possibility that the bulk density or specific surface area of the catalyst cannot satisfy the preferred range. Also, the carrier can be prepared in accordance with a usual method and can be carried out by mixing and burning an aluminum oxide material and a manganese oxide material at a predetermined ratio. In addition, the carrier may be any shape such as powder, granule, tablet molding, extrusion molding and the like.

Also, in the catalyst used in the present invention, amounts of the metal and ruthenium are related to the number of active sites. An amount of the metal in the catalyst used in the present invention is from 0.1 to 10% by mass, preferably from 0.2 to 7% by mass, and more preferably from 0.2 to 3% by mass, based on the catalyst weight. Also, the amount of ruthenium is from 1 to 30% by mass, preferably from 1 to 20% by mass, and more preferably from 1.5 to 10% by mass, based on the catalyst weight. When the amount of each of the metal and ruthenium is less than the above range, not only there is a possibility that sufficient catalytic activity cannot be obtained due to insufficient number of active sites, but also synergistic effect of the metal, ruthenium and the like with the carrier components (aluminum and manganese) cannot be obtained, thus entailing lack in deterioration gradient and catalyst stability (life span). Also, when the amount of each of the metal and ruthenium exceeds the above range, the metal and ruthenium cannot sufficiently be provided on the carrier, their dispersion is reduced, and a metal species and a ruthenium species which do not have interaction with the carrier components, are generated, thus causing an undesirable tendency of considerably reducing the activity and selectivity. Also, the chemical composition of the catalyst was calculated by an inductively coupled plasma mass spectrometry (ICP method).

A specific surface area of the catalyst used in the present invention is from 60 to 350 $m^2/g$, preferably from 80 to 300 $m^2/g$, and more preferably from 100 to 250 $m^2/g$. A specific surface area of less than 60 $m^2/g$ is not preferable because of a possibility of reducing dispersion of the metal and the ruthenium. Also, regarding the upper limit of the specific surface area, larger specific surface areas are preferable generally in handling a solid catalyst, because the gas-liquid-solid contacting frequency is increased. However, when taken into consideration that the practical upper limit of the specific surface area of the carrier containing the aluminum oxide and manganese oxide used in the present invention is approximately from 350 to 380 $m^2/g$, it is considered that this area of the catalyst comprising the metal and ruthenium is approximately 350 $m^2/g$ at the most. Also, the specific surface area of the catalyst was calculated by BET method (Braunauer-Emett-Tailor method) using high purity nitrogen as the probe.

Also, a bulk density of the catalyst used in the present invention is from 0.8 to 1.8 g/ml, preferably from 0.9 to 1.5 g/ml, and more preferably from 0.9 to 1.3 g/ml. However, when taken into consideration that the practical lower limit of the bulk density of the carrier comprising the aluminum oxide and the manganese oxide used in the present invention is approximately 0.7 g/ml, it is considered that the value of the catalyst comprising the metal and ruthenium is approximately 0.8 g/ml at the most. On the other hand, when the bulk density exceeds 1.8 g/ml, the $C_5+$ productivity per catalyst weight becomes low entailing a possibility of being not suitable of the production of a liquid hydrocarbon.

Also, the catalyst used in the present invention has a catalyst particle size distribution range of from 5 to 200 μm, preferably from 5 to 180 μm, and more preferably from 10 to 150 μm. Since the catalyst of the present invention is used in a dispersed state by dispersing it in liquid hydrocarbons, it is preferable to take its particle size distribution into consideration. Fine particles of less than 5 μm have a high possibility of generating problems in that they are passed through a filter or the like and leaked into the downstream side to cause reduction of the catalyst concentration inside the reaction vessel, and an apparatus of the downstream side is damaged by the catalyst fine particles. Also, large particles of exceeding 200 μm have a high possibility of reducing the reaction activity because of a difficulty in uniformly dispersing them in liquid hydrocarbons throughout the entire reaction vessel and due to the formation of irregular slurry in which the catalyst is dispersed.

Even when the particle size distribution is within the above range of from 5 to 200 μm, there is a case in which irregular dispersion occurs when they are dispersed in liquid hydrocarbons. In that case, it is preferable to take an average particle size into consideration for uniformly dispersing the catalyst particles in liquid hydrocarbons without generating irregularity. An average particle size of the catalyst used in the present invention is preferably from 20 to 100 μm, more preferably from 25 to 100 μm, and most preferably from 25 to 80 μm. When the average particle size is outside the upper and lower limits of the range of from 20 to 100 μm, dispersion of the catalyst particles in liquid hydrocarbons may become irregular to cause reduction of the reaction activity.

Regarding preparation of the catalyst used in the present invention, the preparation method by itself can be carried out in accordance with a conventionally known general preparation method of catalysts. In providing the carrier comprising an aluminum oxide and a manganese oxide with the metal and ruthenium, the metal is firstly provided thereon and then burned after removing moisture. Next, the ruthenium is provided thereon and then thoroughly dried after removing moisture. Also, the metal or ruthenium can be provided on the carrier by bringing the carrier into contact with a solution of a catalyst species compound, e.g., by soaking the carrier in a solution of a catalyst species compound such as a compound of the metal or a ruthenium compound, and accumulating the catalyst species compound on the carrier, adhering the catalyst species compound by ion exchange, precipitating the catalyst species compound by adding a precipitant such as an alkali or the like, evaporating the solution to dryness or adding the solution of the catalyst species compound onto the carrier dropwise. In this case, in order to control amounts of the metal and ruthenium in the thus obtained catalyst of interest, amounts of these catalyst species compounds to be contained in the carrier is adjusted. Examples of the compound of the metal provided on the carrier include chlorides, carbonates, nitrates, ammonia salts and the like of sodium, potassium, lithium, beryllium, barium, magnesium, cerium, calcium, yttrium and the like. Among these, compounds of sodium, potassium, calcium and the like are preferably used. The compounds of a certain metal including an alkali metal can be used alone or as a mixture of two or more. Also, as the ruthenium compound, various ruthenium compounds conventionally used in the preparation of ruthenium-provided catalysts can be used by optionally selecting them. Preferred examples include water-soluble ruthenium salts such as ruthenium chloride, ruthenium nitrate, ruthenium acetate, ruthenium hexachloroammonium chloride and the like and organic solvent-soluble ruthenium compounds such as ruthenium carbonyl, ruthenium acetylacetonate and the like. The carrier in which the metal and ruthenium are contained in the above manner is dried. Drying can be carried out generally by keeping it at from ordinary temperature to 300° C. for 10 to 48 hours. The thus dried carrier containing respective catalyst species is optionally pulverized and classified, if necessary, to obtain a desired catalyst particle size distribution and further made into a state of powder having a desired average particle size as occasion demands, so that a catalyst used in the present invention having predetermined various physical properties can be obtained.

According to the method of the present invention for producing hydrocarbons, the catalyst prepared in the above manner is subjected to a reduction treatment (activation treatment) in advance prior to subjecting to the FT reaction. By the reduction treatment, the catalyst is activated so that it shows the desired catalytic activity in the FT reaction. When the reduction treatment is not carried out, the metal and ruthenium provided on the carrier are not sufficiently reduced and do not show the desired catalytic activity for the FT reaction. The reduction treatment can be preferably carried out either by a method in which the catalyst in a state of slurry prepared by dispersing it in liquid hydrocarbons is brought into contact with a reducing gas or a method in which a reducing gas is simply brought into contact with the catalyst by blowing it without using hydrocarbons. As the liquid hydrocarbons for dispersing the catalyst in the former method, various hydrocarbons including olefins, alkanes, alicyclic hydrocarbons and aromatic hydrocarbons can be used, so long as they are liquids under the treating conditions. Also, it may be a hetero atom-containing hydrocarbon such as oxygen-containing, nitrogen-containing hydrocarbons or the like. The number of carbons of the hydrocarbons is not particularly limited, so long as they are liquids under the treating conditions, but generally, those of $C_6$ to $C_{40}$ are preferable, those of $C_9$ to $C_{40}$ are more preferable, and those of $C_9$ to $C_{35}$ are most preferable. In hydrocarbons lighter than $C_6$, the vapor pressure of the solvent becomes high so that the range of their treating condition is limited. Also, in hydrocarbons heavier than $C_{40}$, the solubility of the reducing gas is reduced which causes a possibility that sufficient reduction treatment becomes impossible. Moreover, an amount of the catalyst dispersed in hydrocarbons is suitably a concentration of from 1 to 50 w/v %, preferably from 3 to 40 w/v %, and more preferably from 5 to 35 w/v %. When the amount of catalyst is less than 1% by mass, reducing efficiency of the catalyst is decreased. Although there is a method to reduce quantity of gas flow of the reducing gas as a method for preventing decrease in the reducing efficiency of the catalyst, this is not preferable because the gas (reducing gas)-liquid (solvent)-solid (catalyst) dispersion is inhibited when the quantity of gas flow of the reducing gas is reduced. On the other hand, a large amount of the catalyst exceeding 50% by mass is not preferable because the viscosity of the slurry prepared by dispersing the catalyst in hydrocarbons becomes so high that dispersion of bubbles becomes poor and reduction of the catalyst cannot be made sufficiently. The reduction treatment temperature is preferably from 140 to 310° C., more preferably from 150 to 250° C., and most preferably from 160 to 220° C. When it is less than 140° C., ruthenium is not sufficiently reduced so that sufficient reaction activity cannot be obtained. Also, when it is a high temperature exceeding 310° C., changes in the phase transition and oxidation conditions of the manganese oxide and the like in the carrier are advanced to form a complex with ruthenium, thereby causing sintering of the catalyst so that a possibility of causing reduction of the activity becomes high. In the reduction treatment, a reducing gas containing hydrogen as the main component can be used preferably. The reducing gas used may contain a component other than hydrogen, such as water vapor, nitrogen, rare gas and the like, in a certain amount, so long as the reduction is not inhibited. The reduction treatment is influenced by the hydrogen partial pressure and treating time together with the above treating temperature, and the hydrogen partial pressure is preferably from 0.1 to 10 MPa, more preferably from 0.5 to 6 MPa, and most preferably from 1 to 5 MPa. The reduction treatment time varies depending on the amount of catalyst, rate of hydrogen flow and the like, but in general, is preferably from 0.1 to 72 hours, more preferably from 1 to 48 hours, and most preferably from 4 to 48 hours. When the treating time is less than 0.1 hour, activation of the catalyst becomes insufficient. Also, when the reduction treatment is carried out for a prolonged period of time exceeding 72 hours, there is no bad influence upon the catalyst, but it causes an undesirable problem such as high treatment cost while improvement of the catalyst performance cannot be obtained.

It is preferable that the catalyst after the reduction treatment shows a certain range of ruthenium dispersion. That is, in general, the dispersion of ruthenium means a percentage of the adsorbed carbon monoxide (CO) mole numbers of the catalyst after reduction treatment based on the ruthenium mole numbers in the catalyst, and is defined by the following formula.

$$\text{Ru dispersion} = \frac{\text{Adsorbed CO mol numbers of catalyst}}{\text{Ru mole numbers in catalyst}} \times 100$$

The dispersion of ruthenium shows, among ruthenium in the catalyst, the ratio of ruthenium species showing activity on the hydrogenation of CO, and means that, in the same provided amount of ruthenium, higher dispersion of ruthenium indicates larger number of ruthenium species in the catalyst contributing to the reaction and indicates higher activity on the hydrogenation of CO. Also, both of the CO hydrogenation activity and chain propagation activity ($\alpha$) are necessary for a catalyst to be used in the FT reaction. Therefore, even if the CO hydrogenation activity is increased, the catalyst is not suitable for the production of liquid hydrocarbons as the object of the present invention when the chain propagation activity ($\alpha$) becomes low. Accordingly, it is preferable that the catalyst used in the present invention shows from 16 to 50% of dispersion of ruthenium after the reduction treatment.

Then, according to the method of the present invention for the production of hydrocarbons, the catalyst reduction-treated in the above manner is subjected to the FT reaction, namely a synthesis reaction of hydrocarbons. In the FT reaction of the present invention, the catalyst is made into a dispersed state by dispersing it in liquid hydrocarbons, and a synthesis gas is brought into contact with the dispersed catalyst. In this case, as the hydrocarbons in which the catalyst is to be dispersed, similar hydrocarbons used in the reduction treatment which is carried out in advance can be used. That is, various hydrocarbons including olefins, alkanes, alicyclic hydrocarbons and aromatic hydrocarbons and hetero atom-containing hydrocarbons such as oxygen-containing, nitrogen-containing hydrocarbons and the like can be used, so long as they are liquids under the treating conditions. The number of carbons of these hydrocarbons is not particularly limited, but generally, those of $C_6$ to $C_{40}$ are preferable, those of $C_9$ to $C_{40}$ are more preferable, and those of $C_9$ to $C_{35}$ are most preferable. In hydrocarbons lighter than $C_6$, a vapor pressure of the solvent becomes high so that the range of their reaction condition is limited. Also, in hydrocarbons heavier than $C_{40}$, solubility of the synthesis gas as the material is reduced which causes a possibility that the reaction activity is reduced. When a method which is carried out by dispersing the catalyst in liquid hydrocarbons is employed in the reduction treatment to be carried out in advance, the liquid hydrocarbons used in the reduction treatment can be used directly in the FT reaction. An amount of the catalyst to be dispersed in hydrocarbons is a concentration of from 1 to 50 w/v %, preferably from 3 to 40 w/v %, and more preferably from 5 to 35 w/v %. When the amount of catalyst is less than 1% by mass, the activity is reduced. Although there is a method to reduce quantity of gas flow of the synthesis gas as a method for preventing decrease in the activity, this is not desirable because the gas (synthesis gas)-liquid (solvent)-solid (catalyst) dispersion is inhibited when the quantity of gas flow of the synthesis gas is reduced. On the other hand, a large amount of the catalyst exceeding 50% by mass is not preferable because viscosity of the slurry prepared by dispersing the catalyst in hydrocarbons becomes so high that dispersion of bubbles becomes poor and sufficient reaction activity cannot be obtained.

The synthesis gas used in the FT reaction contains hydrogen and carbon monoxide as main components and may contain other components which do not inhibit the FT reaction. Since the rate (k) of the FT reaction depends on the hydrogen partial pressure about primarily, it is preferable that the partial pressure ratio of hydrogen and carbon monoxide ($H_2/CO$ molar ratio) is 0.6 or more. Since the reaction accompanies reduction of volume, a higher total value of the partial pressures of hydrogen and carbon monoxide is preferable. Although the upper limit of the partial pressure ratio of hydrogen and carbon monoxide is not particularly limited, a practical range of this partial pressure rate is suitably from 0.6 to 2.7, preferably from 0.8 to 2.5, and more preferably from 1 to 2.3. When the partial pressure ratio is less than 0.6, the yield of the formed hydrocarbons is reduced, and when the partial pressure ratio exceeds 2.7, it causes a tendency to increase light fractions in the formed hydrocarbons.

Accordingly, in the conditions that carbon dioxide is substantially absent, a total pressure (total value of partial pressures of all components) of the synthesis gas (gas mixture) to be subjected to the FT reaction is preferably from 1 to 10 MPa, more preferably from 1.5 to 6 MPa, and most preferably from 1.8 to 4.5 MPa. A value of less than 1 MPa is not preferable because the speed of the FT reaction becomes insufficient to cause a tendency of reducing the yield of gasoline fractions, kerosine and gas oil fractions, wax fractions and the like. On the equilibrium basis, higher partial pressures of hydrogen and carbon monoxide are advantageous, but the upper limit of these partial pressures is limited from the industrial point of view, because higher partial pressures increase plant construction cost and the like and the operation cost increases due to large-scaling of compressors and the like which are necessary for compression. Herein, the conditions that carbon dioxide is substantially absent mean that carbon dioxide is absent or the amount of the carbon dioxide present is less than 0.5% based on the total pressure of hydrogen and carbon monoxide of the synthesis gas.

On the other hand, in the conditions that carbon dioxide coexists, as the carbon dioxide to be coexisted, those which are obtained, for example, from reforming reaction of a petroleum product, natural gas and the like can be used without problems, and it may be contaminated with other components which do not inhibit the FT reaction, e.g., it may contain water vapor, partially oxidized nitrogen and the like as those which are obtained from the steam reforming reaction of petroleum products and the like. Also, the carbon dioxide can be positively added to a synthesis gas which does not contain carbon dioxide, or the carbon dioxide in a carbon dioxide-containing synthesis gas obtained by reforming natural gas by a method such as autothermal reforming, steam reforming or the like can be used, namely, a synthesis gas containing carbon dioxide can be subjected directly to the FT reaction without carrying out a decarbondioxide treatment. When a synthesis gas containing carbon dioxide is subjected directly to the FT reaction, facility construction cost and operation cost necessary for the decarbondioxide treatment can be cut down, and production cost of hydrocarbons obtained by the FT reaction can be reduced. An amount of the carbon dioxide to be coexisted is from 0.5 to 50%, preferably from 0.5 to 30%, and more preferably from 1 to 10%, based on the total pressure of hydrogen and carbon monoxide of the synthesis gas to be subjected to the FT reaction. When a partial pressure of carbon dioxide in the synthesis gas (gas mixture) to be subjected to the FT reaction is a low value of less than the above range, the FT reaction-accelerating effect of carbon dioxide cannot be obtained, and when it is a high value of exceeding the above range, partial pressures of hydrogen and carbon monoxide in the synthesis gas (gas mixture) to be subjected to the FT reaction are reduced and the yield of hydrocarbons is reduced which is economically disadvantageous. Regarding the timing to coexist carbon dioxide, it may coexist in the reaction system at the early stage of the FT reaction, but in order to improve conversion ratio of carbon monoxide by exerting the FT reaction accelerating effect of carbon dioxide more effectively, it is preferable to effect its coexistence by introducing it into the reaction system during a period of from 10 to 100 hours after commencement of the FT reaction.

Accordingly, a total pressure (total value of partial pressures of all components) of the synthesis gas (gas mixture) to be subjected to the FT reaction is preferably from 1 to 10 MPa, more preferably from 1.5 to 6 MPa, and most preferably from 1.8 to 4.5 MPa. A value of less than 1 MPa is not preferable because the chain propagation becomes insufficient to cause a tendency of reducing the yield of gasoline fractions, kerosine and gas oil fractions, wax fractions and the like. On the equilibrium basis, higher partial pressures of hydrogen and carbon monoxide are advantageous, but the upper limit of these partial pressures is limited from the industrial point of view, because higher partial pressures increase plant construction cost and the like and the operation cost increases due to large-scaling of compressors and the like which are necessary for compression.

In both conditions that carbon dioxide is substantially absent and that carbon dioxide coexists, the gas mixture comprising hydrogen and carbon monoxide may contain certain amounts of other components, such as example, vapor, nitrogen, inert gas and the like, so long as they do not inhibit the FT reaction.

In the FT reaction, when the $H_2/CO$ molar ratio of the synthesis gas is constant, lower temperature generally accelerates chain propagation and increases olefin selectivity but reduces CO conversion ratio. On the other hand, higher temperature reduces chain propagation and olefin selectivity but increases CO conversion ratio. Also, when the $H_2/CO$ ratio becomes high, the CO conversion ratio becomes high and the chain propagation and olefin selectivity are reduced, and the opposite occurs when the $H_2/CO$ ratio becomes low. In the present invention, although the degree of the effects of these factors on the reaction varies depending on the kind of catalyst to be used and the like, the reaction temperature under the conditions that carbon dioxide is substantially absent is preferably from 170 to 300° C., more preferably of from 190 to 290° C., and most preferably from 200 to 290° C., and the reaction temperature under the conditions that carbon dioxide coexists is preferably from 200 to 350° C., more preferably from 210 to 310° C., and most preferably from 220 to 290° C.

When hydrocarbons are synthesized in the coexistence of carbon dioxide from a gas mixture containing hydrogen and carbon monoxide as the main components according to the method of the present invention for the production of hydrocarbons, good results are obtained in that the CO conversion ratio becomes 60% or more by one path (once through conversion), the chain propagation probability ($\alpha$) becomes from 0.86 to 0.95, the olefin/paraffin ratio in a lower hydrocarbon, e.g., in a $C_3$ hydrocarbon, becomes from 3 to 5, and the $C_5+$ productivity becomes from 400 to 1,100 g/kg/hr. Also, by subjecting a synthesis gas containing carbon dioxide directly to the FT reaction, facility construction cost and operation cost necessary for the decarbondioxide treatment can be cut down, and a synthesis gas containing a large amount of carbon dioxide, derived from a poor quality natural gas containing a large amount of carbon dioxide, can be used as the starting material.

Also, the CO conversion ratio, chain propagation probability ($\alpha$) and $C_5+$ productivity are defined by the following equations.

CO Conversion Ratio:

$$CO\ conversion\ ratio = \frac{A-B}{A} \times 100$$

A: CO mole numbers in synthetic gas per unit hour
B: CO mole numbers in outlet gas per unit hour
Chain Propagation Probability ($\alpha$):

When the mass ratio in a product of a hydrocarbon of carbon numbers n is defined as Mn and the chain propagation probability ($\alpha$) is defined as $\alpha$, the following relationship is formed according to the Schultz-Flory distribution. Thus, the a value can be known from the slope log $\alpha$ when log (Mn/n) and n are plotted.

$$\log(Mn/n)=\log((1-\alpha)^2/\alpha)+n\cdot\log\alpha$$

Productivity of $C_5+$:

Productivity of $C_5+$ means the produced amount of $C_5+$ per catalyst weight per unit hour and is defined by the following equation:

$$C_5+\ productivity = C_5+\ production\ (g)/catalyst\ weight\ (kg)/(hr)$$

The present invention are further illustratively shown below based on Examples and Comparative Examples, but the present invention is not limited to these examples.

Also, CO and $CH_4$ in the following examples was analyzed by thermal conductivity gas chromatography (TCD-GC) using active carbon (60/80 mesh) as the separation column. Furthermore, a synthesis gas was used by adding 10 vol % of Ar as the internal standard. Moreover, peak positions and peak areas of CO and $CH_4$ were analyzed qualitatively and quantitatively by comparing them with Ar. In the analysis of $C_1$ to $C_6$ hydrocarbons, detection and determination of the hydrocarbons were carried out by flame ionization detector gas chromatography (FID-GC) using a capillary column ($Al_2O_3$/KCl PLOT) as the separation column and by comparing with $C_1$ (methane) which can be analyzed in common with TCD-GC. In addition, in the analysis of $C_5$ to $C_{40}$ hydrocarbons, detection and determination of these hydrocarbons were carried out by FID-GC equipped with a capillary column (TC-1) and by comparing with $C_5$ and $C_6$ which can be analyzed in common with light hydrocarbons ($C_1$ to $C_6$). The specific surface area of the catalyst (including carrier) was measured by the BET method using an automatic surface area measuring apparatus (Belsorp 28, manufactured by Bell Japan Corp.) and using nitrogen as the probe molecule. Chemical components of the catalyst was identified by ICP (CQM-10000P, manufactured by Shimadzu Corporation), the particle distribution was obtained using a particle size measuring apparatus (Mastersizer MSX-46, manufactured by Malvern) by a laser beam scattering method, and the structure of manganese oxide was analyzed by X-ray diffraction (RINT 2500, manufactured by Rigaku Industrial Corporation).

For the measurement of the mole numbers of CO adsorbed on the catalyst, a full-automatic catalyst-gas adsorption measuring apparatus (R-6015, manufactured by Ohkurariken Co., Ltd.) integrated with TCD gas chromatography was used. Regarding the adsorbed CO mole number measuring procedure, helium gas was used as the carrier gas, and hydrogen gas as the reducing gas, and a catalyst put into a test tube was firstly heated to reducing temperature by flowing hydrogen gas to carry out reduction and then cooled to 50° C. by changing to helium gas, and thereafter, CO gas was fed into the test tube at a predetermined flow rate to measure the mole number of adsorbed CO.

EXAMPLE 1

Purified water (hereinafter referred to as "water") was added dropwise to alkaline alumina powder which had been thoroughly dried in advance, and saturated amount of water absorption was calculated. The saturated amount of water absorption was 0.9 ml/g in this case. Aluminum oxide (30 g) was impregnated with an aqueous solution prepared by dissolving 168 g of manganese nitrate hexahydrate in 27 ml of water, allowed to stand for about 4 hours, dried at a temperature of 110° C. in the air, and then burned at 600° C. for 3 hours in the air in a muffle furnace. The thus obtained carrier comprising aluminum oxide and manganese oxide was impregnated with an aqueous solution prepared by dissolving 0.2 g of sodium carbonate (Na assay: 43.2% by mass) in 27 g of water, followed by drying at a temperature of 110° C. in the air and then burned at 600° C. for 3 hours in a muffle furnace. Thereafter, the thus obtained carrier by impregnating the carrier comprising aluminum oxide and manganese oxide with sodium was further impregnated with an aqueous solution prepared by dissolving 2.2 g of ruthenium chloride (Ru assay: 36% by mass) in 27 g of water, allowed to stand for 1 hour and then dried at a temperature of 50° C. in the air. The dried product was transferred into an agate mortar, pulverized and then screened into a catalyst particle distribution of from 5 to 200 μm to obtain Catalyst A. Catalyst A has an average particle size of 95 μm, a bulk density of 1.6 g/ml and a specific surface area of 100 m²/g. As a result of the structural analysis by X-ray diffraction, the manganese oxide was $Mn_2O_3$ having an average number of charges of $Mn^{3+}$. Also, as a result of compositional analysis using ICP, it contained 1% by mass in terms of Ru, 0.1% by mass in terms of Na, 60% by mass of $Mn_2O_3$ and the balance as aluminum oxide (aluminum oxide:manganese oxide=100 parts by mass: 154 parts by mass). Catalyst A (0.3 g) and 30 ml of a dispersion medium normal hexadecane (n-$C_{16}H_{34}$, hereinafter referred to as "solvent") (slurry concentration: 1 g/100 ml) were packed in a 100 ml capacity reaction vessel, and hydrogen was brought into contact with Catalyst A under a hydrogen partial pressure of 10 MPa·G, at a temperature of 140° C. and at a flow rate of 100 ml/min (STP: standard temperature and pressure) to carry out the reduction for 1 hour. After the reduction, the atmosphere was replaced by helium gas, the temperature was adjusted to 100° C., and the pressure was adjusted to ordinary pressure. Thereafter, the atmosphere was changed to a gas mixture comprising 10 vol % of argon, 56.3 vol % of carbon monoxide and hydrogen as the balance ($H_2$/CO ratio: 0.6, hereinafter referred to as "synthesis gas"), the FT reaction was carried out at a temperature of 210° C. under a total pressure of hydrogen and carbon monoxide partial pressures (hereinafter referred to as "$H_2$+CO pressure") of 10 MPa·G. The feeding amount of the synthesis gas was adjusted to 60% as one path CO conversion ratio (hereinafter referred to as "conversion ratio"), and the W/F (weight/flow (g·hr/mol)) was 11.5 g·hr/mol. As a result of carrying out the FT reaction, the chain propagation probability (α) was 0.92, the $C_5$+ selectivity was 92%, the olefin/paraffin ratio in $C_3$ was 4, and the $C_5$+ productivity was 420 g/kg/hr.

EXAMPLE 2

In the same manner as in Example 1, 30 g of alkaline alumina powder was impregnated with 113 g of manganese nitrate, then with 0.3 g of sodium carbonate and then with 2.7 g of ruthenium chloride to thereby obtain Catalyst B having physical properties of a particle distribution of from 5 to 200 μm, an average particle size of 95 μm, a bulk density of 1.45 g/ml and a specific surface area of 140 m²/g and comprising 1.5% by mass in terms of Ru, 0.2% by mass in terms of Na, 50% by mass of $Mn_2O_3$ and the balance as aluminum oxide (aluminum oxide:manganese oxide=100 parts by mass: 104 parts by mass). Catalyst B (0.9 g) and 30 ml of the solvent (slurry concentration: 3 g/100 ml) were packed in a reaction vessel, and hydrogen was brought into contact with Catalyst B under a hydrogen partial pressure of 6 MPa·G, at a temperature of 150° C. and at a flow rate of 100 ml/min (STP) to carry out the reduction for 0.5 hour. After the reduction, the atmosphere was replaced by helium gas, the temperature was adjusted to 100° C., and the pressure was adjusted to ordinary pressure. Thereafter, the atmosphere was changed to a synthesis gas comprising 10 vol % of argon, 50 vol % of carbon monoxide and hydrogen as the balance ($H_2$/CO ratio: 0.8), the FT reaction was carried out at a temperature of 230° C. under an $H_2$+CO pressure of 6 MPa·G. The feeding amount of the synthesis gas yielding a conversion ratio of 60% was W/F 11.1 g·hr/mol. As a result of carrying out the reaction, the chain propagation probability (α) was 0.92, the $C_5$+ selectivity was 90%, the olefin/paraffin ratio in $C_3$ was 4, and the $C_5$+ productivity was 380 g/kg/hr.

EXAMPLE 3

In the same manner as in Example 1, 30 g of alkaline alumina powder was impregnated with 6.6 g of manganese nitrate, then with 2.6 g of sodium carbonate and then with 10.5 g of ruthenium chloride to thereby obtain Catalyst C having physical properties of a particle distribution of from 10 to 180 μm, an average particle size of 90 μm, a bulk density of 0.8 g/ml and a specific surface area of 300 m²/g and comprising 10% by mass in terms of Ru, 3% by mass in terms of Na, 5% by mass of $Mn_2O_3$ and the balance as aluminum oxide (aluminum oxide:manganese oxide=100 parts by mass: 6 parts by mass). Catalyst C (10.5 g) was were packed in a reaction vessel, and hydrogen was brought into contact with Catalyst C under a hydrogen partial pressure of 1 MPa·G, at a temperature of 220° C. and at a flow rate of 100 ml/min (STP) to carry out 48 hour of reduction. After the reduction, the atmosphere was replaced by helium gas, the temperature was adjusted to 100° C., the pressure was adjusted to ordinary pressure, and 30 ml of the solvent (slurry concentration: 35 g/100 ml) was fed into the reaction vessel under a forced pressure. Thereafter, the atmosphere was changed to a synthesis gas comprising 10 vol % of argon, 27.3 vol % of carbon monoxide and hydrogen as the balance ($H_2$/CO ratio: 2.3), the FT reaction was carried out at a temperature of 280° C. under an $H_2$ + CO pressure of 1.8 MPa·G. The feeding amount of the synthesis gas yielding a conversion ratio of 60% was W/F 2.2 g·hr/mol. As a result of carrying out the FT reaction, the chain propagation probability ($\alpha$) was 0.89, the $C_5$+ selectivity was 82%, the olefin/paraffin ratio in $C_3$ was 3.8, and the $C_5$+ productivity was 930 g/kg/hr.

EXAMPLE 4

In the same manner as in Example 1, 30 g of alkaline alumina powder was impregnated with 17.3 g of manganese nitrate, then with 7.8 g of sodium carbonate and then with 27.2 g of ruthenium chloride to thereby obtain Catalyst D having physical properties of a particle distribution of from 5 to 40 μm, an average particle size of 20 μm, a bulk density of 0.9 g/ml and a specific surface area of 220 m$^2$/g and comprising 20% by mass in terms of Ru, 7% by mass in terms of K, 10% by mass of $Mn_2O_3$ and the balance as aluminum oxide (aluminum oxide:manganese oxide=100 parts by mass: 16 parts by mass). Catalyst D (12 g) was packed in a reaction vessel, and hydrogen was brought into contact with Catalyst D under a hydrogen partial pressure of 0.5 MPa·G, at a temperature of 250° C. and at a flow rate of 100 ml/min (STP) to carry out the reduction for 24 hours. After the reduction, the atmosphere was replaced by helium gas, the temperature was adjusted to 100° C., the pressure was adjusted to ordinary pressure, and 30 ml of the solvent (slurry concentration: 40 g/100 ml) was fed into the reaction vessel under a forced pressure. Thereafter, the atmosphere was changed to a synthesis gas comprising 10 vol % of argon, 25.7 vol % of carbon monoxide and hydrogen as the balance ($H_2$/CO ratio: 0.8), the FT reaction was carried out at a temperature of 290° C. under an $H_2$+CO pressure of 1.5 MPa·G. The feeding amount of the synthesis gas yielding a conversion ratio of 60% was W/F 2.0 g·hr/mol. As a result of carrying out the FT reaction, the chain propagation probability ($\alpha$) was 0.88, the $C_5$+ selectivity was 83%, the olefin/paraffin ratio in $C_3$ was 3.9, and the $C_5$+ productivity was 1000 g/kg/hr.

EXAMPLE 5

In the same manner as in Example 1, 30 g of alkaline alumina powder was impregnated with 85.7 g of manganese nitrate, then with 23.4 g of sodium carbonate and then with 85.7 g of ruthenium chloride to thereby obtain Catalyst E having physical properties of a particle distribution of from 5 to 70 μm, an average particle size of 25 μm, a bulk density of 1.8 g/ml and a specific surface area of 60 m$^2$/g and comprising 30% by mass in terms of Ru, 10% by mass in terms of Na, 30% by mass of $Mn_2O_3$ and the balance as aluminum oxide (aluminum oxide:manganese oxide=100 parts by mass: 100 parts by mass). Catalyst E (15 g) was packed in a reaction vessel, and hydrogen was brought into contact with Catalyst E under a hydrogen partial pressure of 0.1 MPa·G, at a temperature of 310° C. and at a flow rate of 100 ml/min (STP) to carry out the reduction for 6 minutes. After the reduction, the atmosphere was replaced by helium gas, the temperature was adjusted to 100° C., the pressure was adjusted to ordinary pressure, and 30 ml of the solvent (slurry concentration: 3 g/100 ml) was fed into the reaction vessel under a forced pressure. Thereafter, the atmosphere was changed to a synthesis gas comprising 10 vol % of argon, 50 vol % of carbon monoxide and hydrogen as the balance ($H_2$/CO ratio: 2.7), the FT reaction was carried out at a temperature of 300° C. under an $H_2$+CO pressure of 1 MPa·G. The feeding amount of the synthesis gas yielding a conversion ratio of 60% was W/F 2.2 g·hr/mol. As a result of carrying out the FT reaction, the chain propagation probability ($\alpha$) was 0.88, the $C_5$+ selectivity was 80%, the olefin/paraffin ratio in $C_3$ was 3.9, and the $C_5$+ productivity was 830 g/kg/hr.

EXAMPLE 6

In the same manner as in Example 1, 30 g of alkaline alumina powder was impregnated with 168 g of manganese nitrate, then with 0.8 g of calcium nitrate tetrahydrate (Ca assay: 17% by mass) and then with 2.2 g of ruthenium chloride to thereby obtain Catalyst F having physical properties of a particle distribution of from 5 to 200 μm, an average particle size of 95 μm, a bulk density of 1.6 g/ml and a specific surface area of 100 m$^2$/g and comprising 1% by mass in terms of Ru, 0.1% by mass in terms of Ca, 60% by mass of $Mn_2O_3$ and the balance as aluminum oxide (aluminum oxide:manganese oxide=100 parts by mass: 154 parts by mass). Catalyst F (0.3 g) and 30 ml of the solvent (slurry concentration: 3 g/100 ml) were packed in a reaction vessel, and hydrogen was brought into contact with Catalyst F under a hydrogen partial pressure of 10 MPa·G, at a temperature of 140° C. and at a flow rate of 100 ml/min (STP) to carry out the reduction for 1 hour. After the reduction, the atmosphere was replaced by helium gas, the temperature was adjusted to 100° C., and the pressure was adjusted to ordinary pressure. The Ru dispersion of Catalyst F after the reduction was 38%. Thereafter, the atmosphere was changed to a synthesis gas comprising 10 vol % of argon, 56.3 vol % of carbon monoxide and hydrogen as the balance ($H_2$/CO ratio: 0.6), the FT reaction was started at a temperature of 210° C. under an $H_2$+CO pressure of 10 MPa·G, and 20 hours thereafter, the FT reaction was carried out by introducing carbon dioxide under a partial pressure of 0.05 MPa. The feeding amount of the synthesis gas yielding a conversion ratio of 60% was W/F 10.7 g·hr/mol. After 48 hours from the commencement of the reaction, the chain propagation probability ($\alpha$) was 0.91, the $C_5$+ selectivity was 89%, the olefin/paraffin ratio in $C_3$ was 4, and the $C_5$+ productivity was 435 g/kg/hr. Also, the FT reaction was carried out by repeating the same procedure except that introduction of carbon dioxide was not carried out. As a result, the chain propagation probability ($\alpha$) was 0.92, the $C_5$+ selectivity was 92%, the olefin/paraffin ratio in $C_3$ was 4, and the $C_5$+ productivity was 420 g/kg/hr.

EXAMPLE 7

In the same manner as in Example 1, 30 g of alkaline alumina powder was impregnated with 113 g of manganese nitrate, then with 0.4 g of potassium carbonate (K assay: 28.3% by mass) and then with 2.7 g of ruthenium chloride to thereby obtain Catalyst G having physical properties of a particle distribution of from 5 to 200 μm, an average particle size of 95 μm, a bulk density of 1.45 g/ml and a specific surface area of 140 m$^2$/g and comprising 1.5% by mass in terms of Ru, 0.2% by mass in terms of K, 50% by mass of Mn$_2$O$_3$ and the balance as aluminum oxide (aluminum oxide:manganese oxide=100 parts by mass: 104 parts by mass.). Catalyst G (0.9 g) and 30 ml of the solvent (slurry concentration: 3 g/100 ml) were packed in a reaction vessel, and hydrogen was brought into contact with Catalyst G under a hydrogen partial pressure of 6 MPa·G, at a temperature of 150° C. and at a flow rate of 100 ml/min (STP) to carry out the reduction for 0.5 hour. After the reduction, the atmosphere was replaced by helium gas, the temperature was adjusted to 100° C., and the pressure was adjusted to ordinary pressure. The Ru dispersion of Catalyst G after the reduction was 39%. Thereafter, the atmosphere was changed to a synthesis gas comprising 10 vol % of argon, 50 vol % of carbon monoxide and hydrogen as the balance (H$_2$/CO ratio: 0.8), the FT reaction was started at a temperature of 230° C. under an H$_2$+CO pressure of 6 MPa·G, and 20 hours thereafter, the FT reaction was carried out by introducing carbon dioxide under a partial pressure of 0.06 MPa. The feeding amount of the synthesis gas yielding a conversion ratio of 60% was W/F 10.1 g·hr/mol. After 48 hours from the commencement of the reaction, the chain propagation probability (α) was 0.91, the C$_5$+ selectivity was 88%, the olefin/paraffin ratio in C$_3$ was 4, and the C$_5$+ productivity was 405 g/kg/hr. Also, the FT reaction was carried out by repeating the same procedure except that introduction of carbon dioxide was not carried out. As a result, the chain propagation probability (α) was 0.92, the C$_5$+ selectivity was 90%, the olefin/paraffin ratio in C$_3$ was 4, and the C$_5$+ productivity was 380 g/kg/hr.

EXAMPLE 8

In the same manner as in Example 1, 30 g of alkaline alumina powder was impregnated with 114.8 g of manganese nitrate, then with 0.7 g of sodium carbonate (Na assay: 43.2% by mass) and then with 3.6 g of ruthenium chloride to thereby obtain Catalyst H having physical properties of a particle distribution of from 10 to 180 μm, an average particle size of 80 μm, a bulk density of 1.45 g/ml and a specific surface area of 140 m$^2$/g and comprising 2% by mass in terms of Ru, 0.5% by mass in terms of Na, 50% by mass of Mn$_2$O$_3$ and the balance as aluminum oxide (aluminum oxide:manganese oxide=100 parts by mass: 105 parts by mass). Catalyst H (1.5 g) was packed in a reaction vessel, and hydrogen was brought into contact with Catalyst H under a hydrogen partial pressure of 5 MPa·G, at a temperature of 160° C. and at a flow rate of 100 ml/min (STP) to carry out the reduction for 72 hours. After the reduction, the atmosphere was replaced by helium gas, the temperature was adjusted to 100° C., the pressure was adjusted to ordinary pressure, and then 30 ml of the solvent (slurry concentration: 5 g/100 ml) was fed into the reaction vessel under a forced pressure. The Ru dispersion of Catalyst H after the reduction was 33%. Thereafter, the atmosphere was changed to a synthesis gas comprising 10 vol % of argon, 45 vol % of carbon monoxide and hydrogen as the balance (H$_2$/CO ratio: 1), the FT reaction was started at a temperature of 240° C. under an H$_2$+CO pressure of 4.5 MPa·G, and 20 hours thereafter, the FT reaction was carried out by introducing carbon dioxide under a partial pressure of 0.45 MPa. The feeding amount of the synthesis gas yielding a conversion ratio of 60% was W/F 7.5 g·hr/mol. After 48 hours from the commencement of the reaction, the chain propagation probability (α) was 0.90, the C$_5$+ selectivity was 86%, the olefin/paraffin ratio in C$_3$ was 3.9, and the C$_5$+ productivity was 485 g/kg/hr. Also, the FT reaction was carried out by repeating the same procedure except that introduction of carbon dioxide was not carried out. As a result, the chain propagation probability (α) was 0.91, the C$_5$+ selectivity was 88%, the olefin/paraffin ratio in C$_3$ was 4, and the C$_5$+ productivity was 420 g/kg/hr.

EXAMPLE 9

In the same manner as in Example 1, 30 g of alkaline alumina powder was impregnated with 49.5 g of manganese nitrate, then with 1 g of sodium carbonate and then with 3.9 g of ruthenium chloride to thereby obtain Catalyst I having physical properties of a particle distribution of from 20 to 150 μm, an average particle size of 60 μm, a bulk density of 1.25 g/ml and a specific surface area of 165 m$^2$/g and comprising 3% by mass in terms of Ru, 0.9% by mass in terms of Na, 30% by mass of Mn$_2$O$_3$ and the balance as aluminum oxide (aluminum oxide:manganese oxide=100 parts by mass: 45 parts by mass). Catalyst I (9 g) and 30 ml of the solvent (slurry concentration: 30 g/100 ml) were packed in a reaction vessel, and hydrogen was brought into contact with Catalyst I under a hydrogen partial pressure of 2 MPa·G, at a temperature of 170° C. and at a flow rate of 100 ml/min (STP) to carry out the reduction for 4 hours. After the reduction, the atmosphere was replaced by helium gas, the temperature was lowered to 100° C., and the pressure was returned to ordinary pressure. The Ru dispersion of Catalyst I after the reduction was 33%. Thereafter, the atmosphere was changed to a synthesis gas comprising 10 vol % of argon, 30 vol % of carbon monoxide and hydrogen as the balance (H$_2$/CO ratio: 2), the FT reaction was started at a temperature of 270° C. under an H$_2$+CO pressure of 2 MPa·G, and 20 hours thereafter, the FT reaction was carried out by introducing carbon dioxide under a partial pressure of 0.2 MPa. The feeding amount of the synthesis gas yielding a conversion ratio of 60% was W/F 4.0 g·hr/mol. After 48 hours from the commencement of the reaction, the chain propagation probability (α) was 0.89, the C$_5$+ selectivity was 85%, the olefin/paraffin ratio in C$_3$ was 3.9, and the C$_5$+ productivity was 595 g/kg/hr. Also, the FT reaction was carried out by repeating the same procedure except that introduction of carbon dioxide was not carried out. As a result, the chain propagation probability (α) was 0.9, the C$_5$+ selectivity was 85%, the olefin/paraffin ratio in C$_3$ was 4, and the C$_5$+ productivity was 500 g/kg/hr.

EXAMPLE 10

In the same manner as in Example 1, 30 g of alkaline alumina powder was impregnated with 50.3 g of manganese nitrate, then with 1 g of sodium carbonate and then with 5.3 g of ruthenium chloride to thereby obtain Catalyst J having a particle distribution of from 20 to 125 μm, an average particle size of 50 μm, a bulk density of 1.25 g/ml and a specific surface area of 165 m$^2$/g and comprising 4% by mass in terms of Ru, 0.9% by mass in terms of Na, 30% by mass of Mn$_2$O$_3$ and the balance as aluminum oxide (aluminum oxide:manganese oxide=100 parts by mass: 46 parts by mass). Catalyst J (9 g) and 30 ml of the solvent (slurry concentration: 30 g/100 ml) were packed in a reaction vessel, and hydrogen was brought into contact with Catalyst J under a hydrogen partial pressure of 2 MPa·G, at a temperature of 170° C. and at a flow rate of 100 ml/min (STP) to carry out the reduction for 4 hours. After the reduction, the atmosphere was replaced by helium gas, and the temperature was lowered to 100° C., and the pressure was adjusted to ordinary pressure. The Ru dispersion of Catalyst J after the reduction was 30%. Thereafter, the atmosphere was changed to a synthesis gas comprising 10 vol % of argon, 30 vol % of carbon monoxide and hydrogen as the balance ($H_2$/CO ratio: 2), the FT reaction was started at a temperature of 270° C. under an $H_2$+CO pressure of 2 MPa·G, and 20 hours thereafter, the FT reaction was carried out by introducing carbon dioxide under a partial pressure of 0.2 MPa. The feeding amount of the synthesis gas yielding a conversion ratio of 60% was W/F 2.3 g·hr/mol. After 48 hours from the commencement of the reaction, the chain propagation probability ($\alpha$) was 0.89, the $C_5$+ selectivity was 85%, the olefin/paraffin ratio in $C_3$ was 3.9, and the $C_5$+ productivity was 1050 g/kg/hr. Also, the FT reaction was carried out by repeating the same procedure except that introduction of carbon dioxide was not carried out. As a result, the chain propagation probability ($\alpha$) was 0.9, the $C_5$+ selectivity was 85%, the olefin/paraffin ratio in $C_3$ was 4, and the $C_5$+ productivity was 900 g/kg/hr.

EXAMPLE 11

In the same manner as in Example 1, 30 g of alkaline alumina powder was impregnated with 6.6 g of manganese nitrate, then with 3.2 g of potassium carbonate and then with 10.5 g of ruthenium chloride to thereby obtain Catalyst K having a particle distribution of from 10 to 180 $\mu$m, an average particle size of 90 $\mu$m, a bulk density of 0.8 g/ml and a specific surface area of 300 $m^2$/g and comprising 10% by mass in terms of Ru, 3% by mass in terms of K, 5% by mass of $Mn_2O_3$ and the balance as aluminum oxide (aluminum oxide:manganese oxide=100 parts by mass: 6 parts by mass). Catalyst K (10.5 g) was packed in a reaction vessel, and hydrogen was brought into contact with Catalyst K under a hydrogen partial pressure of 1 MPa·G, at a temperature of 220° C. and at a flow rate of 100 ml/min (STP) to carry out the reduction for 48 hours. After the reduction, the atmosphere was replaced by helium gas, the temperature was adjusted to 100° C., the pressure was adjusted to ordinary pressure, and then 30 ml of the solvent (slurry concentration: 35 g/100 ml) was fed into the reaction vessel under a forced pressure. The Ru dispersion of Catalyst K after the reduction was 29%. Thereafter, the atmosphere was changed to a synthesis gas comprising 10 vol % of argon, 27.3 vol % of carbon monoxide and hydrogen as the balance ($H_2$/CO ratio: 2.3), the FT reaction was started at a temperature of 280° C. under an $H_2$+CO pressure of 1.8 MPa·G, and 20 hours thereafter, the FT reaction was carried out by introducing carbon dioxide under a partial pressure of 0.9 MPa. The feeding amount of the synthesis gas yielding a conversion ratio of 60% was W/F 2.0 g·hr/mol. After 48 hours from the commencement of the reaction, the chain propagation probability ($\alpha$) was 0.89, the $C_5$+ selectivity was 81%, the olefin/paraffin ratio in $C_3$ was 3.7, and the $C_5$+ productivity was 1030 g/kg/hr. Also, the FT reaction was carried out by repeating the same procedure except that introduction of carbon dioxide was not carried out. As a result, the chain propagation probability ($\alpha$) was 0.89, the $C_5$+ selectivity was 82%, the olefin/paraffin ratio in $C_3$ was 3.8, and the $C_5$+ productivity was 930 g/kg/hr.

EXAMPLE 12

In the same manner as in Example 1, 30 g of alkaline alumina powder was impregnated with 17.3 g of manganese nitrate, then with 34.2 g of calcium nitrate and then with 27.2 g of ruthenium chloride to thereby obtain Catalyst L having a particle distribution of from 5 to 40 $\mu$m, an average particle size of 20 $\mu$m, a bulk density of 0.9 g/ml and a specific surface area of 220 $m^2$/g and comprising 20% by mass in terms of Ru, 7% by mass in terms of Ca, 10% by mass of $Mn_2O_3$ and the balance as aluminum oxide (aluminum oxide:manganese oxide=100 parts by mass: 16 parts by mass). Catalyst L (12 g) was packed in a reaction vessel, and hydrogen was brought into contact with. Catalyst L under a hydrogen partial pressure of 0.5 MPa·G, at a temperature of 250° C. and at a flow rate of 100 ml/min (STP) to carry out the reduction for 24 hours. After the reduction, the atmosphere was replaced by helium gas, the temperature was adjusted to 100° C., the pressure was adjusted to ordinary pressure, and then 30 ml of the solvent (slurry concentration: 40 g/100 ml) was fed into the reaction vessel under a forced pressure. The Ru dispersion of Catalyst L after the reduction was 22%. Thereafter, the atmosphere was changed to a synthesis gas comprising 10 vol % of argon, 25.7 vol % of carbon monoxide and hydrogen as the balance ($H_2$/CO ratio: 2.5), the FT reaction was started at a temperature of 300° C. under an $H_2$+CO pressure of 1.5 MPa·G, and 20 hours thereafter, the FT reaction was carried out by introducing carbon dioxide under a partial pressure of 0.45 MPa. The feeding amount of the synthesis gas yielding a conversion ratio of 60% was W/F 1.8 g·hr/mol. After 48 hours from the commencement of the reaction, the chain propagation probability ($\alpha$) was 0.88, the $C_5$+ selectivity was 80%, the olefin/paraffin ratio in $C_3$ was 3.9, and the $C_5$+ productivity was 1000 g/kg/hr. Also, the FT reaction was carried out by repeating the same procedure except that introduction of carbon dioxide was not carried out. As a result, the chain propagation probability ($\alpha$) was 0.88, the $C_5$+ selectivity was 80%, the olefin/paraffin ratio in $C_3$ was 3.9, and the $C_5$+ productivity was 1000 g/kg/hr.

EXAMPLE 13

In the same manner as in Example 1, 30 g of alkaline alumina powder was impregnated with 85.7 g of manganese nitrate, then with 102.7 g of calcium nitrate and then with 85.7 g of ruthenium chloride to thereby obtain Catalyst M having a particle distribution of from 5 to 70 $\mu$m, an average particle size of 25 $\mu$m, a bulk density of 1.8 g/ml and a specific surface area of 60 $m^2$/g and comprising 30% by mass in terms of Ru, 10% by mass in terms of Ca, 30% by mass of $Mn_2O_3$ and the balance as aluminum oxide (aluminum oxide:manganese oxide=100 parts by mass: 100 parts by mass). Catalyst M (15 g) was packed in a reaction vessel, and hydrogen was brought into contact with Catalyst M under a hydrogen partial pressure of 0.1 MPa·G, at a temperature of 310° C. and at a flow rate of 100 ml/min (STP) to carry out the reduction for 6 minutes. After the reduction, the atmosphere was replaced by helium gas, the temperature was adjusted to 100° C., the pressure was adjusted to ordinary pressure, and then 30 ml of the solvent (slurry concentration: 50 g/100 ml) was fed into the reaction vessel under a forced pressure. The Ru dispersion of Catalyst M after the reduction was 18%. Thereafter, the atmosphere was changed to a synthesis gas comprising 10 vol % of argon, 24.3 vol % of carbon monoxide and hydrogen as the balance ($H_2$/CO ratio: 2.7), the FT reaction was started at a temperature of 320° C. under an $H_2$+CO pressure of 1 MPa·G, and 20 hours thereafter, the FT reaction was carried out by introducing carbon dioxide under a partial pressure of 0.3 MPa. The feeding amount of the synthesis gas yielding a conversion ratio of 60% was W/F 2.0 g·hr/mol. After 48 hours from the commencement of the reaction, the chain propagation probability ($\alpha$) was 0.86, the $C_5$+ selectivity was 78%, the olefin/paraffin ratio in $C_3$ was 3.6, and the $C_5+$ productivity was 930 g/kg/hr. Also, the FT reaction was carried out by repeating the same procedure except that introduction of carbon dioxide was not carried out. As a result, the chain propagation probability ($\alpha$) was 0.88, the $C_5+$ selectivity was 80%, the olefin/paraffin ratio in $C_3$ was 3.8, and the $C_5+$ productivity was 830 g/kg/hr.

COMPARATIVE EXAMPLE 1

A catalyst was prepared in the same manner as in Example 1 except that the burning temperature was set to 800° C. to thereby obtain Catalyst N having a particle distribution of from 10 to 150 μm, an average particle size of 80 μm, a bulk density of 1.8 g/ml and a specific surface area of 55 m²/g and comprising 3% by mass in terms of Ru, 0.9% by mass in terms of Na, 30% by mass of $Mn_2O_3$ and the balance as aluminum oxide (aluminum oxide:manganese oxide=100 parts by mass: 45 parts by mass). Catalyst N (9 g) and 30 ml of the solvent (slurry concentration: 30 g/100 ml) were packed in a reaction vessel, and hydrogen was brought into contact with Catalyst N under a hydrogen partial pressure of 2 MPa·G, at a temperature of 170° C. and at a flow rate of 100 ml/min (STP) to carry out the reduction for 2 hours. After the reduction, the atmosphere was replaced by helium gas, the temperature was adjusted to 100° C., the pressure was adjusted to ordinary pressure, and then the atmosphere was changed to a synthesis gas comprising 10% by volume of argon, 30% by volume of carbon monoxide and hydrogen as the balance ($H_2$/CO ratio: 2) to carry out the FT reaction at a temperature of 270° C. under an $H_2$+CO pressure of 2 MPa·G. The feeding amount of the synthesis gas yielding a conversion ratio of 60% was W/F 16.4 g·hr/mol. As a result of carrying out the FT reaction, the chain propagation probability ($\alpha$) was 0.9, the $C_5+$ selectivity was 85%, the olefin/paraffin ratio in $C_3$ was 4, and the $C_5+$ productivity was 145 g/kg/hr.

Since the specific surface area of the catalyst is too small in this example, the $C_5+$ productivity is low.

COMPARATIVE EXAMPLE 2

A catalyst was prepared in the same manner as in Example 9 except that the burning temperature was set to 900° C. to thereby obtain Catalyst O having physical properties of a particle distribution of from 10 to 150 μm, an average particle size of 80 μm, a bulk density of 2 g/ml and a specific surface area of 50 m²/g and comprising 3% by mass in terms of Ru, 0.9% by mass in terms of Na, 30% by mass of $Mn_2O_3$ and the balance as aluminum oxide (aluminum oxide:manganese oxide=100 parts by mass: 45 parts by mass). Catalyst O (9 g) and 30 ml of the solvent (slurry concentration: 30 g/100 ml) were packed in a reaction vessel, Catalyst O was subjected to hydrogen reduction in the same manner as in Comparative Example 1, and then the FT reaction was carried out by bringing a synthesis gas comprising argon, carbon monoxide and hydrogen into contact with this catalyst in the same manner as in Comparative Example 1. The feeding amount of the synthesis gas yielding a conversion ratio of 60% was W/F 18.3 g·hr/mol. As a result of carrying out the FT reaction, the chain propagation probability ($\alpha$) was 0.9, the $C_5+$ selectivity was 85%, the olefin/paraffin ratio in $C_3$ was 4, and the $C_5+$ productivity was 130 g/kg/hr.

Since the bulk density of the catalyst is too large and its specific surface area is too small in this example, the $C_5+$ productivity is low.

COMPARATIVE EXAMPLE 3

In the same manner as in Example 1, 30 g of alkaline alumina powder was impregnated with 47.5 g of manganese nitrate, then with 0.9 g of sodium carbonate and then with 0.1 g of ruthenium chloride to thereby obtain Catalyst P having a particle distribution of from 10 to 150 μm, an average particle size of 80 μm, a bulk density of 1.25 g/ml and a specific surface area of 160 m²/g and comprising 0.1% by mass in terms of Ru, 0.9% by mass in terms of Na, 30% by mass of $Mn_2O_3$ and the balance as aluminum oxide (aluminum oxide:manganese oxide=100 parts by mass: 43 parts by mass). Catalyst P (9 g) and 30 ml of the solvent (slurry concentration: 30 g/100 ml) were packed in a reaction vessel, Catalyst P was subjected to hydrogen reduction in the same manner as in Comparative Example 1, and then the FT reaction was carried out by bringing a synthesis gas comprising argon, carbon monoxide and hydrogen into contact with this catalyst in the same manner as in Comparative Example 1. The feeding amount of the synthesis gas yielding a conversion ratio of 60% was W/F 29.8 g·hr/mol. As a result of carrying out the FT reaction, the chain propagation probability ($\alpha$) was 0.9, the $C_5+$ selectivity was 85%, the olefin/paraffin ratio in $C_3$ was 4, and the $C_5+$ productivity was 80 g/kg/hr.

Since the provided amount of ruthenium of the catalyst is too small in this example, the $C_5+$ productivity is low.

COMPARATIVE EXAMPLE 4

In the same manner as in Example 1, 10 g of alkaline alumina powder was impregnated with 37.5 g of manganese nitrate, then with 0.7 g of sodium carbonate and then with 39.3 g of ruthenium chloride to thereby obtain Catalyst Q having a particle distribution of from 10 to 150 μm, an average particle size of 80 μm, a bulk density of 1.4 g/ml and a specific surface area of 160 m²/g and comprising 40% by mass in terms of Ru, 0.9% by mass in terms of Na, 30% by mass of $Mn_2O_3$ and the balance as aluminum oxide (aluminum oxide:manganese oxide=100 parts by mass: 103 parts by mass). Catalyst Q (9 g) and 30 ml of the solvent (slurry concentration: 30 g/100 ml) were packed in a reaction vessel, the catalyst was subjected to hydrogen reduction in the same manner as in Comparative Example 1, and then the FT reaction was carried out by bringing a synthesis gas comprising argon, carbon monoxide and hydrogen into contact with this catalyst in the same manner as in Comparative Example 1. The feeding amount of the synthesis gas yielding a conversion ratio of 60% was W/F 7.9 g·hr/mol. As a result of carrying out the FT reaction, the chain propagation probability ($\alpha$) was 0.9, the $C_5+$ selectivity was 85%, the olefin/paraffin ratio in $C_3$ was 4, and the $C_5+$ productivity was 300 g/kg/hr.

Since the provided amount of ruthenium of the catalyst is too large in this example, the $C_5+$ productivity is low.

COMPARATIVE EXAMPLE 5

In the same manner as in Example 1, 30 g of alkaline alumina powder was impregnated with 49.5 g of manganese nitrate, then with 32 g of sodium carbonate and then with 3.9 g of ruthenium chloride to thereby obtain Catalyst R having a particle distribution of from 10 to 150 μm, an average particle size of 80 μm, a bulk density of 1.25 g/ml and a specific surface area of 160 m²/g and comprising 3% by mass in terms of Ru, 30% by mass in terms of Na, 30% by mass of $Mn_2O_3$ and the balance as aluminum oxide (aluminum oxide:manganese oxide=100 parts by mass: 81 parts by mass). Catalyst R (9 g) and 30 ml of the solvent (slurry concentration: 30 g/100 ml) were packed in a reaction vessel, the catalyst was subjected to hydrogen reduction in the same manner as in Comparative Example 1, and then the FT reaction was carried out by bringing a synthesis gas comprising argon, carbon monoxide and hydrogen into contact with Catalyst R in the same manner as in Comparative Example 1. The feeding amount of the synthesis gas yielding a conversion ratio of 60% was W/F 9.9 g·hr/mol. As a result of carrying out the FT reaction, the chain propagation probability ($\alpha$) was 0.9, the $C_5+$ selectivity was 85%, the olefin/paraffin ratio in $C_3$ was 4, and the $C_5+$ productivity was 240 g/kg/hr.

Since the amount of the sodium compound provided on the catalyst is too large in this example, the $C_5+$ productivity is low.

COMPARATIVE EXAMPLE 6

In the same manner as in Example 1, 40 g of alkaline alumina powder was impregnated with 0.9 g of sodium carbonate and then with 3.6 g of ruthenium chloride to thereby obtain Catalyst S having a particle distribution of from 10 to 150 μm, an average particle size of 80 μm, a bulk density of 0.75 g/ml and a specific surface area of 360 m²/g and comprising 3% by mass in terms of Ru, 0.9% by mass in terms of Na and the balance as aluminum oxide (no manganese oxide). Catalyst S (9 g) and 30 ml of the solvent (slurry concentration: 30 g/100 ml) were packed in a reaction vessel, and hydrogen was brought into contact with Catalyst S under a hydrogen partial pressure of 2 MPa·G, at a temperature of 170° C. and at a flow rate of 100 ml/min (STP) to carry out the reduction for 4 hours. After the reduction, the atmosphere was replaced by helium gas, the temperature was adjusted to 100° C., and the pressure was adjusted to ordinary pressure. The Ru dispersion of Catalyst S after the reduction was 65%. Thereafter, the atmosphere was changed to a synthesis gas comprising 10 vol % of argon, 30 vol % of carbon monoxide and hydrogen as the balance ($H_2$/CO ratio: 2), the FT reaction was started at a temperature of 270° C. under an $H_2$+CO pressure of 2 MPa·G, and 20 hours thereafter, the FT reaction was carried out by introducing carbon dioxide under a partial pressure of 0.2 MPa. The feeding amount of the synthesis gas yielding a conversion ratio of 60% was W/F 12.9 g·hr/mol. After 48 hours from the commencement of the reaction, the chain propagation probability ($\alpha$) was 0.75, the $C_5+$ selectivity was 69%, the olefin/paraffin ratio in $C_3$ was 0.1, and the $C_5+$ productivity was 150 g/kg/hr. Also, the FT reaction was carried out by repeating the same procedure except that introduction of carbon dioxide was not carried out. As a result, the chain propagation probability ($\alpha$) was 0.8, the $C_5+$ selectivity was 73%, the olefin/paraffin ratio in $C_3$ was 0.5, and the $C_5+$ productivity was 210 g/kg/hr.

Since manganese oxide was not used in the catalyst in this example, each of the chain propagation probability ($\alpha$), $C_5+$ selectivity and olefin/paraffin ratio in $C_3$ was small and the $C_5+$ productivity was also low, and these values were further reduced when carbon dioxide coexists.

COMPARATIVE EXAMPLE 7

A catalyst was prepared in the same manner as in Example 1, except that 145 g of manganese nitrate was burned and impregnated with 0.9 g of sodium carbonate and then with 0.1 g of ruthenium chloride to thereby obtain Catalyst T having a particle distribution of from 10 to 150 μm, an average particle size of 80 μm, a bulk density of 2.4 g/ml and a specific surface area of 40 m²/g and comprising 3% by mass in terms of Ru, 0.9% by mass in terms of Na and $Mn_2O_3$ as the balance (no aluminum oxide). Catalyst T (9 g) and 30 ml of the solvent (slurry concentration: 30 g/100 ml) were packed in a reaction vessel, the catalyst was subjected to hydrogen reduction in the same manner as in Comparative Example 6, the FT reaction was started by bringing a synthesis gas comprising argon, carbon monoxide and hydrogen into contact with this catalyst in the same manner as in Comparative Example 6, and then the FT reaction was carried out by introducing carbon dioxide. The Ru dispersion of Catalyst T after the reduction was 14%. Also, the feeding amount of the synthesis gas yielding a conversion ratio of 60% was W/F 8.3 g·hr/mol. After 48 hours from the commencement of the reaction, the chain propagation probability ($\alpha$) was 0.89, the $C_5+$ selectivity was 83%, the olefin/paraffin ratio in $C_3$ was 5, and the $C_5+$ productivity was 280 g/kg/hr. Also, the FT reaction was carried out by repeating the same procedure except that introduction of carbon dioxide was not carried out. As a result, the chain propagation probability ($\alpha$) was 0.9, the $C_5+$ selectivity was 85%, the olefin/paraffin ratio in $C_3$ was 6, and the $C_5+$ productivity was 150 g/kg/hr.

Since aluminum oxide was not used in the catalyst in this example, the specific surface area of the catalyst was too small and the bulk density of the catalyst was too large, so that the $C_5+$ productivity was low. However, the $C_5+$ productivity was improved to some extent in the coexistence of carbon dioxide.

COMPARATIVE EXAMPLE 8

In the same manner as in Example 1, 30 g of alkaline alumina powder was impregnated with 49.5 g of manganese nitrate and then with 3.9 g of ruthenium chloride to thereby obtain Catalyst U having a particle distribution of from 10 to 150 μm, an average particle size of 80 μm, a bulk density of 1.25 g/ml and a specific surface area of 160 m²/g and comprising 3% by mass in terms of Ru (no Na being provided), 30% by mass of $Mn_2O_3$ and the balance as aluminum oxide (aluminum oxide:manganese oxide=100 parts by mass: 45 parts by mass). Catalyst U (9 g) and 30 ml of the solvent (slurry concentration: 30 g/100 ml) were packed in a reaction vessel, the catalyst was subjected to hydrogen reduction in the same manner as in Comparative Example 1, the FT reaction was started by bringing a synthesis gas comprising argon, carbon monoxide and hydrogen into contact with this catalyst in the same manner as in Comparative Example 1, and then the FT reaction was carried out by introducing carbon dioxide. The Ru dispersion of Catalyst U after the reduction was 35%. Also, the feeding amount of the synthesis gas yielding a conversion ratio of 60% was W/F 5.8 g·hr/mol. After 48 hours from the commencement of the reaction, the chain propagation probability ($\alpha$) was 0.81, the $C_5+$ selectivity was 72%, the olefin/paraffin ratio in $C_3$ was 1 or less, and the $C_5+$ productivity was 350 g/kg/hr. Also, the FT reaction was carried out by repeating the same procedure except that introduction of carbon dioxide was not carried out. As a result, the chain propagation probability ($\alpha$) was 0.85, the $C_5+$ selectivity was 79%, the olefin/paraffin ratio in $C_3$ was 1 or less, and the $C_5+$ productivity was 380 g/kg/hr.

Since no sodium compound was provided on the catalyst in this example, each of the chain propagation probability ($\alpha$), $C_5+$ selectivity and olefin/paraffin ratio in $C_3$ was small, and these values were further reduced when carbon dioxide coexisted.

COMPARATIVE EXAMPLE 9

The FT reaction was carried out in the same manner as in Example 9, except that the partial pressure of carbon dioxide to be introduced 20 hours after commencement of the FT reaction in Example 4 was changed to 1.2 MPa. After 48 hours from the commencement of the reaction, the chain propagation probability (α) was 0.88, the $C_5+$ selectivity was 81%, the olefin/paraffin ratio in $C_3$ was 3.5, and the $C_5+$ productivity was 330 g/kg/hr.

Since the amount of carbon dioxide coexisted was too large, the $C_5+$ productivity was low in this example.

The reaction conditions and results in these Examples and Comparative Examples are shown in Table 1 (Examples) and Table 2 (Comparative Examples).

TABLE 1

|  | Ex. 1 | Ex. 2 | Ex. 3 | Ex. 4 | Ex. 5 |
|---|---|---|---|---|---|
| <Catalyst> (Chemical composition) | A | B | C | D | E |
| Ruthenium (% by mass) | 1 | 1.5 | 10 | 20 | 30 |
| Manganese (% by mass) | 60 | 50 | 5 | 10 | 30 |
| Metal (% by mass) | 0.1 | 0.2 | 3 | 7 | 10 |
| Metal species of the metal | Na | Na | Na | Na | Na |
| Alumina (% by mass) | Balance | Balance | Balance | Balance | Balance |
| (Physical property) | | | | | |
| Specific surface area (m²/g) | 100 | 140 | 300 | 220 | 60 |
| Bulk density (g/ml) | 1.6 | 1.45 | 0.8 | 0.9 | 1.8 |
| Particle distribution (μm) | 5–200 | 5–200 | 10–180 | 5–40 | 5–70 |
| Average particle size (μm) | 95 | 95 | 90 | 20 | 25 |
| <Production conditions> (Activation conditions) | | | | | |
| Temperature (° C.) | 140 | 150 | 220 | 250 | 310 |
| Hydrogen partial pressure (MPa · G) | 10 | 6 | 1 | 0.5 | 0.1 |
| Time (hr) | 1 | 0.5 | 48 | 24 | 0.1 |
| Presence of dispersion medium | Present | Present | Absent | Absent | Absent |
| (Production of hydrocarbons) | | | | | |
| Slurry concentration (g/100 ml) | 1 | 3 | 35 | 40 | 50 |
| $H_2$/CO ratio | 0.6 | 0.8 | 2.3 | 2.5 | 2.7 |
| Reaction temperature (° C.) | 210 | 230 | 280 | 290 | 320 |
| $H_2$—CO pressure (MPa · G) | 10 | 6 | 1.8 | 1.5 | 1 |
| $CO_2$/synthesis gas (%) | 0 | 0 | 0 | 0 | 0 |
| <Reaction results> | | | | | |
| CO conversion ratio (%) | 60 | 60 | 60 | 60 | 60 |
| Chain propagation probability (α) | 0.92 | 0.92 | 0.89 | 0.88 | 0.88 |
| $C_5+$ selectivity (%) | 92 | 92 | 82 | 83 | 80 |
| Olefin/paraffin ratio in $C_3$ | 4 | 4 | 3.8 | 3.9 | 3.9 |
| $C_5+$ productivity (g/kg/hr) | 420 | 380 | 930 | 1000 | 830 |

|  | Ex. 6 | Ex. 7 | Ex. 8 | Ex. 9 |
|---|---|---|---|---|
| <Catalyst> (Chemical composition) | E | F | G | H |
| Ruthenium (% by mass) | 1 | 0.5 | 2 | 3 |
| Manganese (% by mass) | 60 | 50 | 50 | 30 |
| Metal (% by mass) | 0.1 | 0.2 | 0.5 | 0.9 |
| Metal species of the metal | Ca | K | Na | Na |
| Alumina (% by mass) | Balance | Balance | Balance | Balance |
| (Physical property) | | | | |
| Specific surface area (m²/g) | 100 | 140 | 140 | 165 |
| Bulk density (g/ml) | 1.6 | 1.45 | 1.45 | 1.25 |
| Particle distribution (μm) | 5–200 | 5–200 | 10–180 | 20–150 |
| Average particle size (μm) | 95 | 95 | 80 | 60 |
| Ru dispersion (%) | 38 | 39 | 33 | 33 |
| <Production conditions> (Activation conditions) | | | | |
| Temperature (° C.) | 140 | 150 | 160 | 170 |
| Hydrogen partial pressure (MPa · G) | 10 | 6 | 5 | 2 |
| Time (hr) | 1 | 0.5 | 72 | 4 |
| Presence of dispersion medium | Present | Present | Absent | Present |
| (Production of hydrocarbons) | | | | |
| Slurry concentration (g/100 ml) | 1 | 3 | 5 | 30 |
| $H_2$/CO ratio | 0.6 | 0.8 | 1 | 2 |
| Reaction temperature (° C.) | 210 | 230 | 240 | 270 |

TABLE 1-continued

|  |  |  |  |  |  |  |  |  |
|---|---|---|---|---|---|---|---|---|
| H₂—CO pressure (MPa · G) | 10 |  | 6 |  | 4.5 |  | 2 |  |
| CO₂/synthesis gas (%) | 0 | 0.5 | 0 | 1 | 0 | 10 | 0 | 10 |
| <Reaction results> |  |  |  |  |  |  |  |  |
| CO conversion ratio (%) | 60 | 60 | 60 | 60 | 60 | 60 | 60 | 60 |
| Chain propagation probability (α) | 0.92 | 0.91 | 0.92 | 0.91 | 0.91 | 0.9 | 0.9 | 0.89 |
| C₅+ selectivity (%) | 92 | 89 | 90 | 88 | 88 | 86 | 85 | 85 |
| Olefin/paraffin ratio in C₃ | 4 | 4 | 4 | 4 | 4 | 3.9 | 4 | 3.9 |
| C₅+ productivity (g/kg/hr) | 420 | 435 | 380 | 405 | 420 | 485 | 500 | 595 |

|  | Ex. 10 |  | Ex. 11 |  | Ex. 12 |  | Ex. 13 |  |
|---|---|---|---|---|---|---|---|---|
| <Catalyst> | J |  | K |  | L |  | M |  |
| (Chemical composition) |  |  |  |  |  |  |  |  |
| Ruthenium (% by mass) | 4 |  | 10 |  | 20 |  | 30 |  |
| Manganese (% by mass) | 30 |  | 5 |  | 10 |  | 30 |  |
| Metal (% by mass) | 0.9 |  | 3 |  | 7 |  | 10 |  |
| Metal species of the metal | Na |  | K |  | Ca |  | Ca |  |
| Alumina (% by mass) | Balance |  | Balance |  | Balance |  | Balance |  |
| (Physical property) |  |  |  |  |  |  |  |  |
| Specific surface area (m²/g) | 165 |  | 300 |  | 220 |  | 60 |  |
| Bulk density (g/ml) | 1.25 |  | 0.8 |  | 0.9 |  | 1.8 |  |
| Particle distribution (μm) | 20–125 |  | 10–180 |  | 5–40 |  | 5–70 |  |
| Average particle size (μm) | 50 |  | 90 |  | 20 |  | 25 |  |
| Ru dispersion (%) | 30 |  | 29 |  | 22 |  | 18 |  |
| <Production conditions> |  |  |  |  |  |  |  |  |
| (Activation conditions) |  |  |  |  |  |  |  |  |
| Temperature (° C.) | 170 |  | 220 |  | 250 |  | 310 |  |
| Hydrogen partial pressure (MPa · G) | 2 |  | 1 |  | 0.5 |  | 0.1 |  |
| Time (hr) | 4 |  | 48 |  | 24 |  | 0.1 |  |
| Presence of dispersion medium | Present |  | Absent |  | Absent |  | Absent |  |
| (Production of hydrocarbons) |  |  |  |  |  |  |  |  |
| Slurry concentration (g/100 ml) | 30 |  | 35 |  | 40 |  | 50 |  |
| H₂/CO ratio | 2 |  | 2.3 |  | 2.5 |  | 2.7 |  |
| Reaction temperature (° C.) | 270 |  | 280 |  | 300 |  | 320 |  |
| H₂—CO pressure (MPa · G) | 2 |  | 1.8 |  | 1.5 |  | 1 |  |
| CO₂/synthesis gas (%) | 0 | 10 | 0 | 50 | 0 | 30 | 0 | 30 |
| <Reaction results> |  |  |  |  |  |  |  |  |
| CO conversion ratio (%) | 60 | 60 | 60 | 60 | 60 | 60 | 60 | 60 |
| Chain propagation probability (α) | 0.9 | 0.89 | 0.89 | 0.89 | 0.88 | 87 | 0.88 | 0.86 |
| C₅+ selectivity (%) | 85 | 85 | 82 | 81 | 80 | 79 | 80 | 78 |
| Olefin/paraffin ratio in C₃ | 4 | 3.9 | 3.8 | 3.7 | 3.9 | 3.8 | 3.8 | 3.6 |
| C₅+ productivity (g/kg/hr) | 900 | 1050 | 930 | 1030 | 1000 | 1100 | 830 | 930 |

TABLE 2

|  | Comp. Ex. 1 | Comp. Ex. 2 | Comp. Ex. 3 | Comp. Ex. 4 | Comp. Ex. 5 |
|---|---|---|---|---|---|
| <Catalyst> | O | P | Q | R | S |
| (Chemical composition) |  |  |  |  |  |
| Ruthenium (% by mass) | 3 | 3 | 0.1 | 40 | 3 |
| Manganese (% by mass) | 30 | 30 | 30 | 30 | 30 |
| Metal (% by mass) | 0.9 | 0.9 | 0.9 | 0.9 | 30 |
| Metal species of the metal | Na | Na | Na | Na | Na |
| Alumina (% by mass) | Balance | Balance | Balance | Balance | Balance |
| (Physical property) |  |  |  |  |  |
| Specific surface area (m²/g) | 55 | 50 | 160 | 160 | 160 |
| Bulk density (g/ml) | 1.8 | 2 | 1.25 | 1.4 | 1.25 |
| Particle distribution (μm) | 10–150 | 10–150 | 10–150 | 10–150 | 10–150 |
| Average particle size (μm) | 80 | 80 | 80 | 80 | 80 |
| <Production conditions> |  |  |  |  |  |
| (Activation conditions) |  |  |  |  |  |
| Temperature (° C.) | 170 | 170 | 170 | 170 | 170 |
| Hydrogen partial pressure (MPa · G) | 2 | 2 | 2 | 2 | 2 |
| Time (hr) | 4 | 4 | 4 | 4 | 4 |

TABLE 2-continued

| | | | | | |
|---|---|---|---|---|---|
| Presence of dispersion medium (Production of hydrocarbons) | Present | Present | Present | Present | Present |
| Slurry concentration (g/100 ml) | 30 | 30 | 30 | 30 | 30 |
| $H_2$/CO ratio | 2 | 2 | 2 | 2 | 2 |
| Reaction temperature (° C.) | 270 | 270 | 270 | 270 | 270 |
| $H_2$—CO pressure (MPa · G) | 2 | 2 | 2 | 2 | 2 |
| $CO_2$/synthesis gas (%) | 0 | 0 | 0 | 0 | 0 |
| <Reaction results> | | | | | |
| CO conversion ratio (%) | 60 | 60 | 60 | 60 | 60 |
| Chain propagation probability ($\alpha$) | 0.9 | 0.9 | 0.9 | 0.9 | 0.9 |
| $C_5$+ selectivity (%) | 85 | 85 | 85 | 85 | 85 |
| Olefin/paraffin ratio in $C_3$ | 4 | 4 | 4 | 4 | 4 |
| $C_5$+ productivity (g/kg/hr) | 145 | 130 | 80 | 300 | 240 |

| | Comp. Ex. 6 | Comp. Ex. 7 | Comp. Ex. 8 | Comp. Ex. 9 |
|---|---|---|---|---|
| <Catalyst> (Chemical composition) | T | U | V | I |
| Ruthenium (% by mass) | 3 | 3 | 3 | 3 |
| Manganese (% by mass) | 0 | Balance | 30 | 30 |
| Metal in metal (% by mass) | 0.9 | 0.9 | 0 | 0.9 |
| Metal species of the metal | Na | Na | — | Na |
| Alumina (% by mass) | Balance | 0 | Balance | Balance |
| (Physical property) | | | | |
| Specific surface area ($m^2$/g) | 360 | 40 | 160 | 165 |
| Bulk density (g/ml) | 0.75 | 2.4 | 1.25 | 1.25 |
| Particle distribution ($\mu$m) | 10–150 | 10–150 | 10–150 | 20–150 |
| Average particle size ($\mu$) | 80 | 80 | 80 | 60 |
| Ru dispersion (%) | 65 | 14 | 35 | 33 |
| <Production conditions> (Activation conditions) | | | | |
| Temperature (° C.) | 170 | 170 | 170 | 170 |
| Hydrogen partial pressure (MPa · G) | 2 | 2 | 2 | 2 |
| Time (hr) | 4 | 4 | 4 | 4 |
| Presence of dispersion medium (Production of hydrocarbons) | Present | Present | Present | Present |
| Slurry concentration (g/100 ml) | 30 | 30 | 30 | 30 |
| $H_2$/CO ratio | 2 | 2 | 2 | 2 |
| Reaction temperature (° C.) | 270 | 270 | 270 | 270 |
| $H_2$—CO pressure (MPa · G) | 2 | 2 | 2 | 2 |
| $CO_2$/synthesis gas (%) | 0    10 | 0    10 | 0    10 | 60 |
| <Reaction results> | | | | |
| CO conversion ratio (%) | 60   60 | 60   60 | 60   60 | 60 |
| Chain propagation probability ($\alpha$) | 0.8   0.75 | 0.9   0.89 | 0.85   0.81 | 0.88 |
| $C_5$+ selectivity (%) | 73   69 | 85   83 | 79   72 | 81 |
| Olefin/paraffin ratio in $C_3$ | 0.5   0.1 | 6   5 | <1   <0.1 | 3.5 |
| $C_5$+ productivity (g/kg/hr) | 210   150 | 150   280 | 380   350 | 330 |

Industrial Applicability

According to the method for producing hydrocarbons of the present invention, the FT reaction can be carried out stably and smoothly with high chain propagation probability ($\alpha$), excellent olefin selectivity and $C_5$+ productivity and high catalytic activity without causing generation of heat spots and the like. Furthermore, the decarbondioxide step for removing carbon dioxide in a synthesis gas can be simplified or omitted, so that liquid hydrocarbons can be produced efficiently. The method of the present invention can greatly contribute to the increased production of kerosine and gas oil fractions including hydro-cracking of formed wax fractions and dimerization and trimerization of formed olefin.

What is claimed is:

1. A method for producing hydrocarbons, comprising:
   (I) subjecting to a reduction treatment a catalyst comprising a carrier having provided thereon:
      0.1 to 10% by mass of at least one metal selected from an alkali metal, an alkaline earth metal, a rare earth metal and the Group III in the periodic table based on the catalyst weight, and
      1 to 30% by mass of ruthenium based on the catalyst weight,
      said carrier comprising an aluminum oxide and a manganese oxide having an average number of charges of manganese of exceeding $Mn^{2+}$, and
      said catalyst having a specific surface area of from 60 to 350 $m^2$/g and a bulk density of from 0.8 to 1.8 g/ml;
   (II) dispersing the catalyst in liquid hydrocarbons in a concentration of from 1 to 50 w/v %; and
   (III) bringing the catalyst into contact with a gas mixture comprising hydrogen and carbon monoxide at a pressure of from 1 to 10 MPa, and
      (i) at a reaction temperature of from 170 to 300° C. under such conditions that carbon dioxide is substantially absent, or (ii) at a reaction temperature of from 200 to 350° C. under such conditions that carbon dioxide coexists in an amount of from 0.5 to 50% based on the total pressure of the hydrogen and the carbon monoxide.

2. The method according to claim 1, wherein ratio of the aluminum oxide and manganese oxide on the carrier is from 5 to 160 mass parts of the manganese oxide based on 100 mass parts of the aluminum oxide.

3. The method according to claim 1 or 2, wherein the aluminum oxide in the carrier is neutral alumina or alkaline alumina.

4. The method according to claim 1, wherein the catalyst is dispersed in the liquid hydrocarbon in a concentration of from 3 to 40 w/v %.

5. The method according to claim 1, wherein the catalyst is dispersed in the liquid hydrocarbon in a concentration of from 5 to 35 w/v %.

6. The method according to claim 1, wherein the (III) bringing the catalyst into contact with a gas mixture comprising hydrogen and carbon dioxide at a pressure of from 1 to 10 MPa is (i) at a reaction temperature of from 170 to 300° C. under such conditions that carbon dioxide is substantially absent.

7. The method according to claim 1, wherein the (III) bringing the catalyst into contact with a gas mixture comprising hydrogen and carbon dioxide at a pressure of from 1 to 10 MPa is (ii) at a reaction temperature of from 200 to 350° C. under such conditions that carbon dioxide coexists in an amount of from 0.5 to 50% based on the total pressure of the hydrogen and the carbon monoxide.

8. The method according to claim 1, wherein the catalyst has a particle size distribution of from 5 to 200 $\mu$m.

9. The method according to claim 1, wherein the catalyst has a specific surface area of from 80 to 300 $m^2$/g, a bulk density of from 0.9 to 1.5 g/ml and a particle size distribution of from 5 to 180 $\mu$m.

10. The method according to claim 1, wherein the catalyst has a specific surface area of from 100 to 250 $m^2$/g, a bulk density of from 0.9 to 1.3 g/ml and a particle size distribution of from 10 to 150 $\mu$m.

* * * * *